(12) United States Patent
Kawasaki et al.

(10) Patent No.: US 8,526,795 B2
(45) Date of Patent: Sep. 3, 2013

(54) INFORMATION-PROCESSING APPARATUS, CONTENT REPRODUCTION APPARATUS, INFORMATION-PROCESSING METHOD, EVENT-LOG CREATION METHOD AND COMPUTER PROGRAMS

(75) Inventors: Makoto Kawasaki, Tokyo (JP); Hideo Tsukazaki, Tokyo (JP); Takashi Kinouchi, Tokyo (JP); Susumu Takatsuka, Tokyo (JP); Junichiro Sakata, Tokyo (JP)

(73) Assignee: Sony Corporation, Tokyo (JP)

( * ) Notice: Subject to any disclaimer, the term of this patent is extended or adjusted under 35 U.S.C. 154(b) by 1641 days.

(21) Appl. No.: 11/495,573

(22) Filed: Jul. 31, 2006

(65) Prior Publication Data
US 2007/0025701 A1 Feb. 1, 2007

(30) Foreign Application Priority Data
Aug. 1, 2005 (JP) .................................. 2005-223341

(51) Int. Cl.
*H04N 9/80* (2006.01)
(52) U.S. Cl.
USPC .......................... 386/262; 386/239; 386/248
(58) Field of Classification Search
USPC .................. 386/46, 95, 239–262, 353–357
See application file for complete search history.

(56) References Cited

U.S. PATENT DOCUMENTS

| | | | |
|---|---|---|---|
| 6,718,551 B1 * | 4/2004 | Swix et al. .................. | 725/32 |
| 2002/0150384 A1 * | 10/2002 | Yoo et al. .................. | 386/69 |
| 2003/0074661 A1 * | 4/2003 | Krapf et al. .................. | 725/34 |
| 2003/0101451 A1 * | 5/2003 | Bentolila et al. .............. | 725/34 |
| 2003/0135513 A1 | 7/2003 | Quinn et al. | |
| 2003/0135859 A1 * | 7/2003 | Putterman et al. ............. | 725/78 |
| 2003/0236582 A1 | 12/2003 | Zamir et al. | |
| 2004/0017997 A1 | 1/2004 | Cowgill | |
| 2004/0064476 A1 | 4/2004 | Rounds | |
| 2004/0261026 A1 * | 12/2004 | Corson ........................ | 715/704 |
| 2005/0114539 A1 | 5/2005 | Yoon et al. | |

(Continued)

FOREIGN PATENT DOCUMENTS

| | | |
|---|---|---|
| JP | 2003-30966 A | 1/2003 |
| JP | 2003-99459 | 4/2003 |

(Continued)

OTHER PUBLICATIONS

U.S. Appl. No. 11/495,694, filed Jul. 31, 2006, Tsukazaki et al.

(Continued)

*Primary Examiner* — Hung Dang
(74) *Attorney, Agent, or Firm* — Oblon, Spivak, McClelland, Maier & Neustadt, L.L.P.

(57) ABSTRACT

Disclosed herein is an information-processing apparatus including an event-log acquisition section acquiring an event log provided by a content reproduction apparatus capable of reproducing a content as an event log including at least information identifying the content and information indicating a reproduction start date/time and reproduction end date/time of the content, an event-log analysis section deriving a reproduction start date/time and reproduction end date/time of a content reproduced by the content reproduction apparatus from the event log, a playlist generation section generating a playlist, which is to serve as a set of pieces of information each used for identifying a content reproduced during a specific period of time, on the basis of the reproduction start date/time and reproduction end date/time of the content, and a playlist transfer section transmitting the playlist to the content reproduction apparatus.

32 Claims, 24 Drawing Sheets

314

| CID | REPRODUCTION START DATE/TIME | REPRODUCTION END DATE/TIME | CONTINUOUS REPRODUCTION DURATION (SECONDS) |
|---|---|---|---|
| 13501 | 2004/6/6 0:30 | 2004/6/6 2:35 | 225 |
| 13501 | 2004/11/1 20:58 | 2004/11/1 21:06 | 225 |
| 13501 | 2004/11/1 20:57 | 2004/11/1 20:57 | 2 |
| 25091 | 2004/6/9 1:10 | 2004/6/9 1:14 | 234 |
| ⋮ | ⋮ | ⋮ | ⋮ |

350　372　373　374

(56) References Cited

U.S. PATENT DOCUMENTS

| | | | |
|---|---|---|---|
| 2005/0163481 A1* | 7/2005 | Hirai | 386/69 |
| 2005/0232576 A1* | 10/2005 | Godtland et al. | 386/46 |
| 2006/0168624 A1* | 7/2006 | Carney et al. | 725/51 |

FOREIGN PATENT DOCUMENTS

| | | |
|---|---|---|
| JP | 2004-152174 A | 5/2004 |
| JP | 2004-171096 A | 6/2004 |
| JP | 2004-294584 A | 10/2004 |
| JP | 2004-334782 A | 11/2004 |
| JP | 2005-25559 | 1/2005 |
| WO | WO 2004/008460 A1 | 1/2004 |
| WO | WO 2005/046252 A2 | 5/2005 |

OTHER PUBLICATIONS

U.S. Appl. No. 11/492,116, filed Jul. 25, 2006, Konno et al.
U.S. Appl. No. 11/493,797, filed Jul. 27, 2006, Kinouchi et al.
Japanese Office Action issued on Dec. 7, 2010 in corresponding Japanese Application No. 2005-223341 (with an English Translation).
"Thorough Master of a Key Point of the Music Life from Encoding to Management", iPod & iTunes This is the True Usage, Mac People, Japan, ASCII Co., LTD., Aug. 1, 2004, vol. 10, No. 10, pp. 60-61.

* cited by examiner

| EVENT ID | PROCESSING SUBSTANCE |
|---|---|
| 00 | REQUEST FOR A START OF A CONTENT |
| 01 | START OF CONTENT REPRODUCTION |
| 02 | END OF CONTENT REPRODUCTION |
| 03 | START OF FAST FORWARD |
| 04 | START OF REWIND |

FIG. 8

| | |
|---|---|
| ● START ANOTHER MUSICAL CONTENT BY USING Next OR Search | ● Pause |
| — CID CID1<br>— Play t1<br>— Stop t2 (Next START)<br>— CID CID2<br>— Play t3 (Next COMPLETE) | — CID CID1<br>— Play t1<br>— Stop t2 (Pause START)<br>— Play t3 (Pause END) |
| ● REPRODUCTION FROM TOP BY Prev | ● Rew(FF) |
| — CID CID1<br>— Play t1<br>— Stop t2 (Prev START)<br>— CID CID1<br>— Play t3 (Prev COMPLETE) | — CID CID1<br>— Play t1<br>— Stop t2 (Rew START)<br>— Play t3 (Rew END) |
| | ● Rew(FF) |
| ● Repeat | — CID CID1<br>— Play t1<br>— Stop t2 (Rew START)<br>— CID CID2<br>— Play t3 (Rew END) |
| — CID CID1<br>— Play t1<br>— Stop t2<br>— CID CID1<br>— Play t3 | |

F I G . 9

312

350 352 354 356 358 360

| CID | TITLE | ARTIST | ALBUM | GENRE | PERFORMANCE DURATION (SECONDS) |
|---|---|---|---|---|---|
| 00001 | TITLE 9 | ARTIST 5 | ALBUM 6 | GENRE 1 | 225 |
| 00005 | TITLE 1 | ARTIST 1 | ALBUM 1 | GENRE 1 | 234 |
| 13501 | TITLE 4 | ARTIST 3 | ALBUM 3 | GENRE 2 | 199 |
| 70221 | TITLE 5 | ARTIST 3 | ALBUM 3 | GENRE 2 | 254 |
| 00055 | TITLE 6 | ARTIST 4 | ALBUM 4 | GENRE 1 | 248 |
| 00301 | TITLE 3 | ARTIST 2 | ALBUM 2 | GENRE 1 | 188 |
| 10001 | TITLE 2 | ARTIST 2 | ALBUM 2 | GENRE 1 | 269 |
| 25091 | TITLE 8 | ARTIST 5 | ALBUM 5 | GENRE 1 | 201 |
| 50407 | TITLE 7 | ARTIST 5 | ALBUM 5 | GENRE 1 | 267 |
| ⋮ | ⋮ | ⋮ | ⋮ | ⋮ | ⋮ |

| CID 350 | NUMBER OF REPRODUCTIONS 362 | NUMBER OF PAUSES 364 | NUMBER OF SKIPS 366 | NUMBER OF REPEATS 368 | TOTAL REPRODUCTION DURATION (SECONDS) 370 |
|---|---|---|---|---|---|
| 00001 | 6 | 2 | 1 | 2 | 1789 |
| 00005 | 2 | 0 | 0 | 0 | 210 |
| 13501 | 1 | 1 | 2 | 0 | 280 |
| 70221 | 3 | 0 | 0 | 0 | 564 |
| 00055 | 4 | 1 | 1 | 1 | 855 |
| 00301 | 5 | 1 | 0 | 2 | 1270 |
| 10001 | 3 | 2 | 0 | 1 | 744 |
| 25091 | 2 | 0 | 1 | 0 | 544 |
| 50407 | 2 | 0 | 0 | 1 | 500 |
| ... | ... | ... | ... | ... | ... |

| CID 350 | REPRODUCTION START DATE/TIME 372 | REPRODUCTION END DATE/TIME 373 | CONTINUOUS REPRODUCTION DURATION (SECONDS) 374 |
|---|---|---|---|
| 13501 | 2004/6/6 0:30 | 2004/6/6 2:35 | 225 |
| 13501 | 2004/11/1 20:58 | 2004/11/1 21:06 | 225 |
| 13501 | 2004/11/1 20:57 | 2004/11/1 20:57 | 2 |
| 25091 | 2004/6/9 1:10 | 2004/6/9 1:14 | 234 |
| ... | ... | ... | ... |

INFORMATION-PROCESSING APPARATUS, CONTENT REPRODUCTION APPARATUS, INFORMATION-PROCESSING METHOD, EVENT-LOG CREATION METHOD AND COMPUTER PROGRAMS

CROSS REFERENCES TO RELATED APPLICATIONS

The present invention contains subject matter related to Japanese Patent Application JP 2005-223341 filed in the Japanese Patent Office on Aug. 1, 2005, the entire contents of which being incorporated herein by reference.

BACKGROUND OF THE INVENTION

1. Field of the Invention

The present invention relates to an information-processing apparatus, a content reproduction apparatus, an information-processing method, an event-log creation method and computer programs. To put it in detail, the present invention relates to an information-processing apparatus capable of creating a playlist, which is to serve as a set of pieces of information each used for identifying a content satisfying a predetermined condition, on the basis of reproduction operations carried out by the user on contents, a content reproduction apparatus for reproducing contents, an information-processing method adopted by the information-processing apparatus, an event-log creation method adopted by the content reproduction apparatus, a computer program implementing the information-processing method and a computer program implementing the event-log creation method.

2. Description of the Related Art

In the content reproduction apparatus in the past, a reproduction history of contents is recorded in a process to reproduce contents such as audio and video contents. On the basis of a reproduction history recorded for a content, it is possible to carry out processing to charge a content utilization fee to the user listening to the a content and processing to infer a content serving as a favorite with the user. For more information on such a reproduction history, refer to documents such as patent documents 1 and 2. By the way, this patent specification takes Japanese Patent Laid-open No. 2005-25559 as patent document 1 and Japanese Patent Laid-open No. 2003-99459 as patent document 2.

In addition, a playlist is also created on the basis of a reproduction history of contents. In accordance with a contemporary method, the identifier of a content reproduced till its end is recorded in a reproduction history of contents and the number of reproductions for each content is found from the reproduction history. Then, a playlist of contents is created on the basis of the number of reproductions for each content.

SUMMARY OF THE INVENTION

As described above, however, a playlist created on the basis of the number of reproductions for each content as a playlist of contents does not sufficiently reflect the state of reproduction operations carried out by the user on contents. For example, since a content reproduced frequently a year ago before the time of creation of a playlist satisfies the same condition requiring a reproduction frequency to exceed a predetermined number as a content reproduced frequently a week ago, both the contents are put inevitably on the playlist as playlist elements. That is to say, the playlist does not reflect the periods of time in which the user carries out reproduction operations on contents.

In order to solve the problems described above, inventors of the present invention have devised an information-processing apparatus capable of creating a playlist reflecting the state of reproduction operations carried out by the user on contents, a content reproduction apparatus for reproducing contents, an information-processing method adopted by the information-processing apparatus, an event-log creation method adopted by the content reproduction apparatus, a computer program implementing the information-processing method and a computer program implementing the event-log creation method.

In order to solve the problems described above, in accordance with an embodiment of the present invention, there is provided an information-processing apparatus including:

an event-log acquisition section acquiring an event log provided by a content reproduction apparatus capable of reproducing a content as an event log including at least information identifying the content and information indicating a reproduction start date/time and reproduction end date/time of the content;

an event-log analysis section deriving a reproduction start date/time and reproduction end date/time of a content reproduced by the content reproduction apparatus from the event log;

a playlist generation section generating a playlist, which is to serve as a set of pieces of information each used for identifying a content reproduced during a specific period of time, on the basis of the reproduction start date/time and reproduction end date/time of the content; and a playlist transfer section transmitting the playlist to the content reproduction apparatus.

In accordance with the present invention, the information-processing apparatus described above is capable of acquiring information identifying a content reproduced by the content reproduction apparatus and information indicating a reproduction start date/time and reproduction end date/time of the content. Thus, the information-processing apparatus described above is capable of identifying a content reproduced in the content reproduction apparatus during a specific period of time and, hence, capable of creating a playlist to serve as a set of pieces of information each used for identifying a content reproduced during the specific period of time. As a result, the state of an operation carried out by the user to reproduce each content and, in particular, the period of time in which an operation is carried out by the user to reproduce each content can be reflected on the playlist. It is to be noted that the information indicating a reproduction start date/time and reproduction end date/time of a content includes both information to be used for finding the reproduction start date/time and reproduction end date/time of the content by computation and information to be extracted from the log of events as information used for explicitly revealing the reproduction start date/time and reproduction end date/time of the content.

It is possible to provide the information-processing apparatus with a configuration further including a condition inputting section inputting the specific period of time.

It is possible to provide the information-processing apparatus with a configuration in which:

the event-log analysis section finds a total reproduction duration of each content reproduced by the content reproduction apparatus from the event log; and the playlist generation section generates a playlist, which is to serve as a set of pieces of information each used for identifying a content reproduced for at least a predetermined period of time, on the basis of the total reproduction duration of the content.

It is possible to provide the information-processing apparatus with a configuration in which:

the event-log analysis section finds the number of reproductions for each content reproduced by the content reproduction apparatus from the event log; and the playlist generation section generates a playlist, which is to serve as a set of pieces of information each used for identifying a content reproduced at least a predetermined number of times, on the basis of the number of reproductions for the content.

It is possible to provide the information-processing apparatus with a configuration in which:

the event log includes information indicating a transition from a content being reproduced to another content to be reproduced next;

the event-log analysis section finds a skip count, which represents the number of skips each requesting a transition from a content being reproduced to another content to be reproduced next, from the event log for each content reproduced by the content reproduction apparatus; and the playlist generation section generates a playlist, which is to serve as a set of pieces of information each used for identifying a content reproduced to result in a skip count not greater than a predetermined value, on the basis of the skip count.

It is possible to provide the information-processing apparatus with a configuration in which:

the event log includes information indicating stopping of reproduction of a content in the course of the reproduction of the content;

the event-log analysis section finds a pause count, which represents the number of pauses each started by stopping of reproduction of a content in the course of the reproduction of the content, from the event log for each content reproduced by the content reproduction apparatus; and the playlist generation section generates a playlist, which is to serve as a set of pieces of information each used for identifying a content reproduced to result in a pause count not greater than a predetermined value, on the basis of the pause count.

It is possible to provide the information-processing apparatus with a configuration in which:

the event log includes information indicating a plurality of repeated continuous reproductions of a content;

the event-log analysis section finds a repeat count, which represents the number of requested repeats of reproduction of a content, from information included in the event log as the information indicating a plurality of repeated continuous reproductions of the content for each content reproduced by the content reproduction apparatus; and the playlist generation section generates a playlist, which is to serve as a set of pieces of information each used for identifying a content reproduced to result in a repeat count at least equal to a predetermined value, on the basis of the repeat count.

It is possible to provide the information-processing apparatus with a configuration further including:

a content reproduction section reproducing a content;

an event-log storage section storing an event log including at least information identifying a content reproduced by the content reproduction section and information indicating a reproduction start date/time and reproduction end date/time of the content; and an event-log updating section updating an event log stored in the event-log storage section;

In the configuration, the event-log analysis section further derives a reproduction start date/time and reproduction end date/time of a content reproduced by the content reproduction section from information included in an event log stored in the event-log storage section as the information indicating a reproduction start date/time and reproduction end date/time of the content; and the playlist generation section generates a playlist, which is to serve as a set of pieces of information each used for identifying:

a content reproduced by the content reproduction apparatus during a specific period of time, on the basis of a reproduction start date/time and reproduction end date/time included in an event log received from the content reproduction apparatus as the reproduction start date/time and reproduction end date/time of the content; and a content reproduced by the content reproduction section during the specific period of time, on the basis of a reproduction start date/time and reproduction end date/time included in an event log stored in the event-log storage section as the reproduction start date/time and reproduction end date/time of the content.

It is possible to provide the information-processing apparatus with a configuration further including a connection detection section detecting a state in which the content reproduction apparatus is connected to the information-processing apparatus. In the configuration, the event-log acquisition section acquires an event log provided from the content reproduction apparatus, which is connected to the information-processing apparatus as indicated by a result of detection carried out by the connection detection section.

It is possible to provide the information-processing apparatus with a configuration further including:

a playlist storage section storing a playlist generated by the playlist generation section; and a playlist uploading section uploading a playlist stored in the playlist storage section to an external server.

In order to solve the problems described earlier, in accordance with another embodiment of the present invention, there is provided a computer program to be executed by a computer functioning as the information-processing apparatus explained above. The computer program is stored in a storage section employed by the computer. A CPU employed in the computer reads out the program from the storage section and executes the program. In this way, the computer is capable of functioning as the information-processing apparatus. As an alternative, the computer program is stored in a recording medium provided separately from the computer as a recording medium that can be read by the computer. Examples of the recording medium are a magnetic disk and an optical disk.

In order to solve the problems described earlier, in accordance with a further embodiment of the present invention, there is provided an information processing method including the steps of:

acquiring an event log provided by a content reproduction apparatus capable of reproducing a content as an event log including at least information identifying the content reproduced by the content reproduction apparatus and information indicating a reproduction start date/time and reproduction end date/time of the content;

deriving a reproduction start date/time and reproduction end date/time of a content reproduced by the content reproduction apparatus from the event log;

generating a playlist, which is to serve as a set of pieces of information each used for identifying a content reproduced during a specific period of time, on the basis of the reproduction start date/time and reproduction end date/time of the content; and transmitting the playlist to the content reproduction apparatus.

In order to solve the problems described earlier, in accordance with a still further embodiment of the present invention, there is provided a content reproduction apparatus including:

a content storage section storing contents;

a reproduction operation section selecting a specific one from the contents stored in the content storage section;

a date/time generation section generating a date/time;

a content reproduction section reproducing a content selected by the reproduction operation section;

an event-log storage section storing an event log including at least information identifying a content reproduced by the content reproduction section and information indicating a reproduction start date/time and reproduction end date/time of the content;

an event-log creating/updating section creating a new event log and storing the new event log into the event-log storage section and for updating an event log already stored in the event-log storage section by creating a record showing a date/time generated by the date/time generation section and adding the created record to the already stored event log;

an event-log transfer section transmitting an event log stored in the event-log storage section to an external apparatus;

a playlist acquisition section acquiring a playlist generated by the external apparatus on the basis of an event log to serve as a set of pieces of information each used for identifying a content satisfying a predetermined condition; and a playlist storage section storing a playlist acquired by the playlist acquisition section.

In accordance with the present invention, the content reproduction apparatus described above is capable of creating a new event log including at least information identifying a content reproduced by a content reproduction section and information indicating a reproduction start date/time and reproduction end date/time of the content and storing the new log of events into the event-log storage section and capable of updating an event log already stored in the event-log storage section by creating a record showing a date/time generated by the date/time generation section and adding the created record to the already stored log of events. In addition, the content reproduction apparatus described above is also capable of transmitting an event log stored in the event-log storage section to an external apparatus capable of creating a playlist. Thus, the external apparatus is capable of identifying a content reproduced by the content reproduction apparatus during a specific period of time and creating a playlist to serve as a set of pieces of information each used for identifying a content reproduced by the content reproduction apparatus during the specific period of time. As a result, the state of an operation carried out by the user to reproduce each content and, in particular, the period of time in which an operation is carried out by the user to reproduce each content can be reflected on the playlist. It is to be noted that the information indicating a reproduction start date/time and reproduction end date/time of a content includes both information to be used for finding the reproduction start date/time and reproduction end date/time of the content by computation and information to be extracted from the event log as information used for explicitly revealing the reproduction start date/time and reproduction end date/time of the content. That is to say, the log of events may include the reproduction start date/time and the reproduction end date/time themselves or the information to be used for finding the reproduction start date/time and the reproduction end date/time by computation.

It is possible to provide the content reproduction apparatus described above with a configuration in which each event record put on an event log stored in the event-log storage section includes mutually relevant pieces of information such as an event ID showing the type of a process carried out by the content reproduction section on a content, a start date/time of the process and information identifying the content serving as an object of the process.

It is possible to provide the content reproduction apparatus described above with a configuration in which processes carried out by the content reproduction section on a content include a process to reproduce the content.

It is possible to provide the content reproduction apparatus described above with a configuration in which processes carried out by the content reproduction section on a content include at least a process to stop reproduction of the content, a process to put the content being reproduced in a fast-forward mode and a process to put the content being reproduced in a rewind mode.

It is possible to provide the content reproduction apparatus described above with a configuration in which, when a content is reproduced by the content reproduction section from the beginning of data composing the content, the event-log creating/updating section adds the information identifying the content to an event log stored in the event-log storage section.

In order to solve the problems described earlier, in accordance with a still further embodiment of the present invention, there is provided a computer program to be executed by a computer functioning as the content reproduction apparatus explained above. The computer program is stored in a storage section employed by the computer. A CPU employed in the computer reads out the program from the storage section and executes the program. In this way, the computer is capable of functioning as the content reproduction apparatus. As an alternative, the computer program is stored in a recording medium provided separately from the computer as a recording medium that can be read by the computer. Examples of the recording medium are a magnetic disk and an optical disk.

In order to solve the problems described earlier, in accordance with a still further embodiment of the present invention, there is provided an event-log creation method including the steps of:

selecting a specific content stored on a recording medium;

reproducing a content selected at the reproduction operation step;

generating a date/time;

generating an event log, which includes at least information identifying a content reproduced at the content reproduction step and information indicating a reproduction start date/time and reproduction end date/time of the content, by using a date/time generated at the date/time generation step and recording the event log onto the recording medium;

transmitting an event log to an external apparatus; and acquiring a playlist generated by the external apparatus on the basis of an event log to serve as a set of pieces of information each used for identifying a content satisfying a predetermined condition.

As described above, in accordance with the present invention, it is possible to provide an information-processing apparatus capable of creating a playlist reflecting the state of reproduction operations carried out by the user on contents, a content reproduction apparatus for reproducing contents, an information-processing method adopted by the information-processing apparatus, an event-log creation method adopted by the content reproduction apparatus, a computer program implementing the information-processing method and a computer program implementing the event-log creation method.

BRIEF DESCRIPTION OF THE DRAWINGS

FIG. 8 is an explanatory diagram showing reproduction operations each associated with a log of events in the embodiment;

FIG. 9 is an explanatory diagram showing pieces of information stored in a content-information storage section according to the embodiment;

FIG. 10 is an explanatory diagram showing analysis results stored in an analysis-result storage section according to the embodiment;

FIG. 11 is an explanatory diagram showing analysis results stored in an analysis-result storage section according to the embodiment;

DETAILED DESCRIPTION OF THE PREFERRED EMBODIMENT

Figure 1:
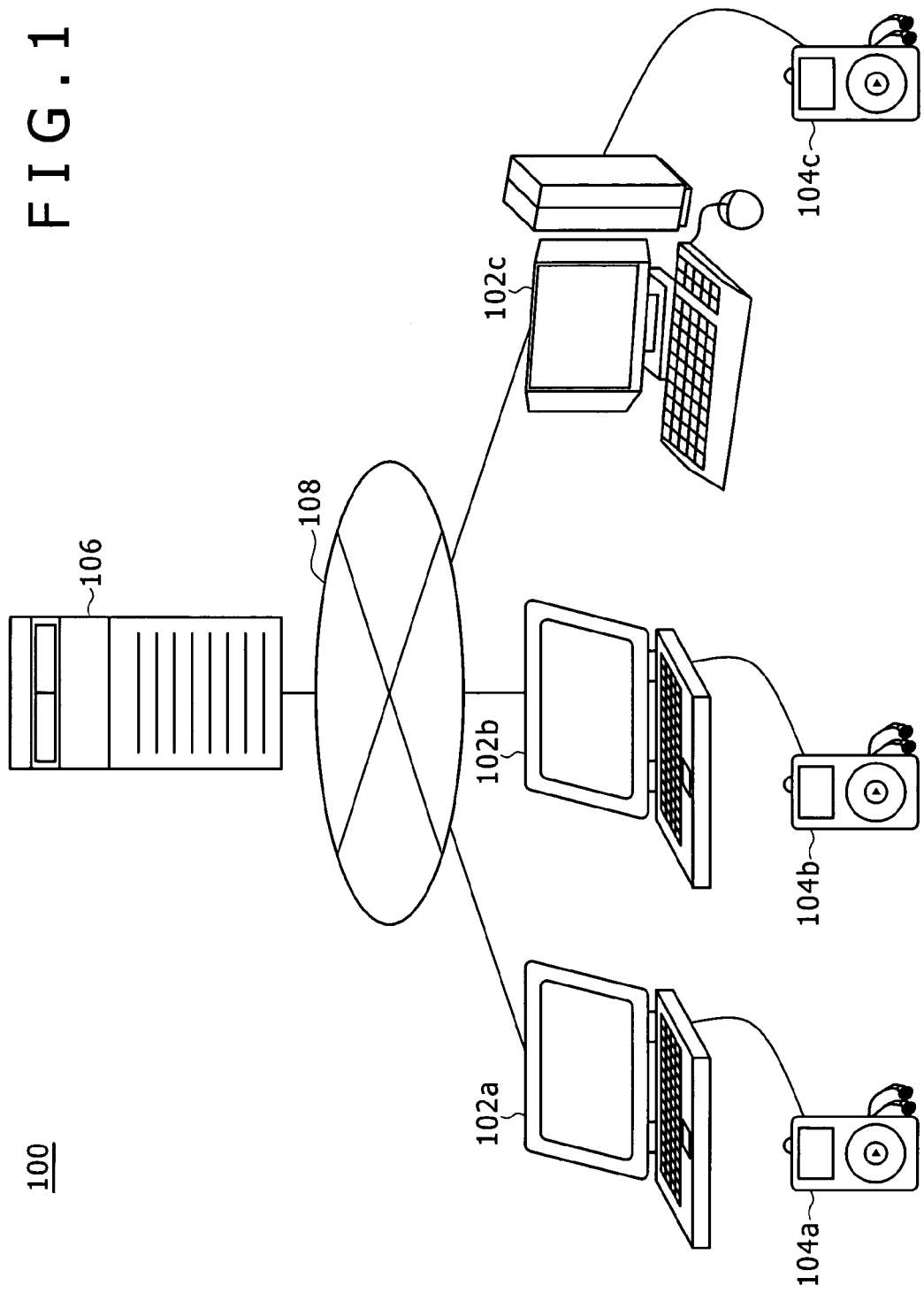
FIG. 1 is an explanatory diagram showing the entire configuration of a playlist providing system according to an embodiment of the present invention.

A preferred embodiment of the present invention is explained in detail by referring to diagrams as follows. It is to be noted that configuration elements having substantially the same functional configuration are denoted by the same reference numeral throughout this patent specification and the diagrams, and they are explained once to avoid duplications of description.

A content reproduction apparatus 104 provided by the present invention as described below is a content reproduction apparatus capable of reproducing a content and creating a log of events for the reproduced content. On the other hand, an information-processing apparatus 102 provided by the present invention as described below is an information-processing apparatus capable of acquiring event logs of contents from the content reproduction apparatus 104 and creating a playlist of contents on the basis of the acquired event logs.

In the embodiment, a content reproduced by the content reproduction apparatus 104 is a musical content. It is to be noted that, even though a content is explained particularly as a musical content in the embodiment, the scope of the present invention is by no means limited to the embodiment. That is to say, the content in the embodiment of the present invention is not necessarily a musical content, but can also be an audio content, a video content or a content of any other type. Examples of the audio content are a lecture and a radio program. The video content can be a static-picture content such as a photo, a drawing or a table or a moving-picture content such as a movie, a television program or a video program. Examples of the content of any other type are an electronic book (E-book), a game and computer software.

<Overall Configuration>

First of all, by referring to FIG. 1, the following description explains the entire configuration of a playlist providing system 100 including the information-processing apparatus 102 and the content reproduction apparatus 104, which are implemented by the embodiment. As shown in the figure, the playlist providing system 100 has a communication network 108, a service server 106, information-processing apparatus 102a, 102b and 102c as well as content reproduction apparatus 104a, 104b and 104c. In the following description, the information-processing apparatus 102a, 102b and 102c are each referred to simply as an information-processing apparatus 102. By the same token, the content reproduction apparatus 104a, 104b and 104c are each referred to simply as a content reproduction apparatus 104.

The content reproduction apparatus 104a, 104b and 104c are each a computer having functions to generate a content and record a history of various kinds of processing for the content as a log of events. The content reproduction apparatus 104 can be a content reproduction apparatus, which has such a size and such a weight that the content reproduction apparatus 104 can be carried by the user. Connected to the information-processing apparatus 102 by radio or wire communication, the content reproduction apparatus 104 transmits a log of events to the information-processing apparatus 102 and acquires a playlist as well as a content from the information-processing apparatus 102.

By the same token, the information-processing apparatus 102a, 102b and 102c are also each a computer having functions to acquire event logs from the content reproduction apparatus 104 and create a playlist on the basis of the event logs. The information-processing apparatus 102 also has functions to reproduce a content, record a history of various kinds of processing for the content as a log of events and create a playlist on the basis of event logs created by the information-processing apparatus 102 itself. In addition, the information-processing apparatus 102 is also capable of creating a playlist on the basis of event logs acquired from the content reproduction apparatus 104 and event logs created by the information-processing apparatus 102 itself. Connected to the content reproduction apparatus 104 by radio or wire communication, the information-processing apparatus 102 is capable of transmitting a created playlist to the content reproduction apparatus 104. On top of that, the information-processing apparatus 102 is also capable of transmitting a playlist to the service server 106 through the communication network 108, which connects the information-processing apparatus 102 to the service server 106.

Connected to the information-processing apparatus 102a, 102b, 102c and so on by the communication network 108, the service server 106 receives a playlist from any of the information-processing apparatus 102. The service server 106 is also capable of creating a new playlist on the basis of a plurality of playlists received from the information-processing apparatus 102 and transmitting the created playlist to the information-processing apparatus 102.

The communication network 108 is configured to function typically as a public line network or a dedicated line network. The public line network or the dedicated line network can each be a radio or wire communication network. Examples of the public line network are the Internet, the telephone line network and the satellite communication network. On the other hand, the dedicated line network can be a WAN, a LAN or an IP-VPN. The entire configuration of the playlist providing system 100 has been described above.

<Hardware Configuration of the Information-Processing Apparatus>

Figure 2:
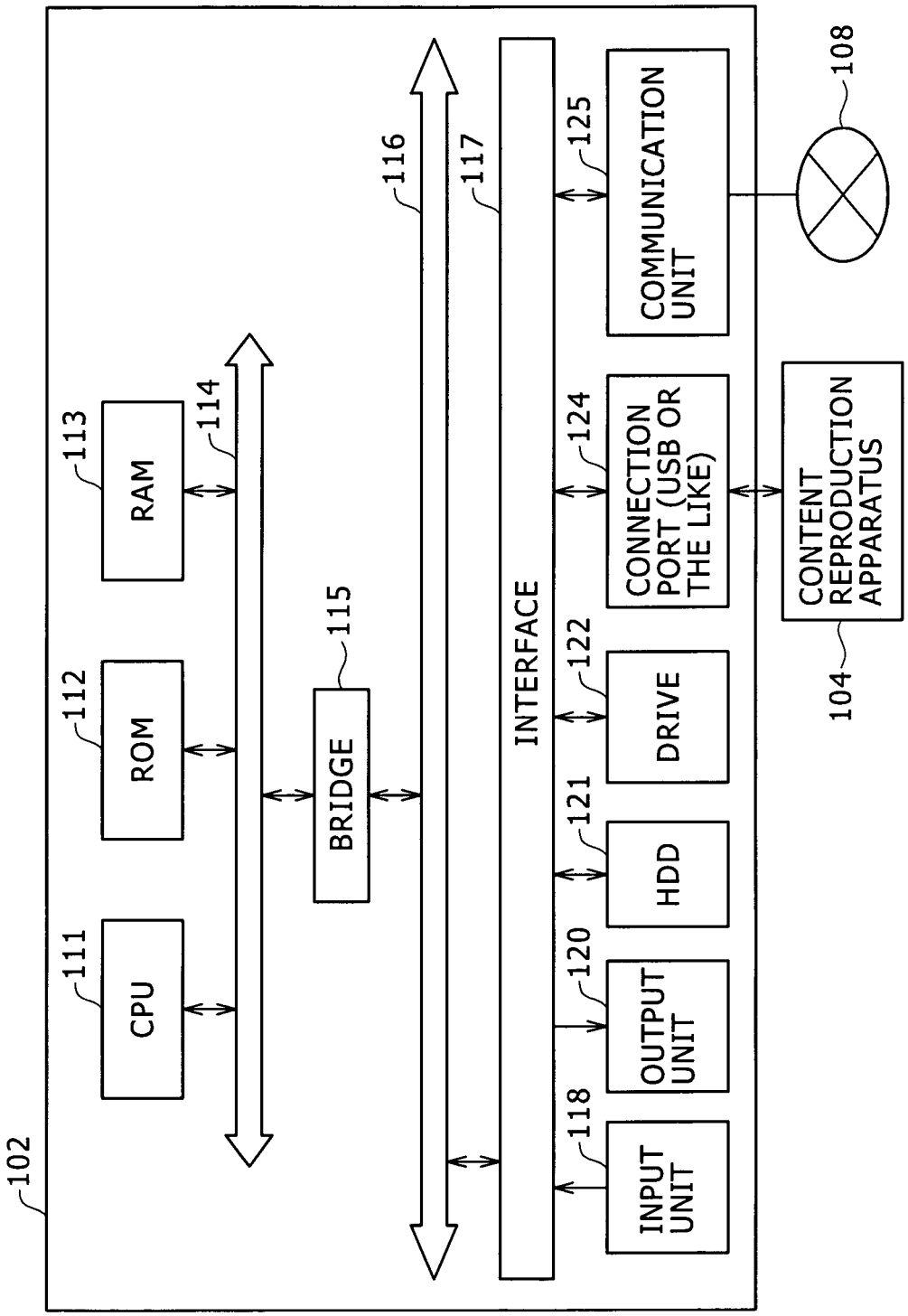
FIG. 2 is a block diagram showing the hardware configuration of an information processing apparatus according to the embodiment.

Next, the hardware configuration of the information-processing apparatus 102 is explained by referring to FIG. 2. As shown in FIG. 2, the information-processing apparatus 102 typically includes a CPU (Central Processing Unit) 111, a ROM (Read Only Memory) 112, a RAM (Random Access Memory) 113, a host bus 114, a bridge 115, an external bus 116, an interface 117, an input unit 118, an output unit 120, an HDD (Hard Disk Drive) serving as a storage unit 121, a drive 122, a connection port 124 and a communication unit 125.

The CPU 111 is a unit functioning as a processing section as well as a control section. By executing a variety of programs stored in the ROM 112 or the HDD 121, the CPU 111 carries out various kinds of processing and controls the other components employed in the information-processing apparatus 102. Examples of the processing carried out by the CPU 111 are a process to analyze a log of events and a process to create a playlist on the basis of results of analyzing event logs.

The ROM 112 is a memory used for storing the programs to be executed by the CPU 111 and data such as processing parameters. The RAM 113 is a memory used for temporarily storing a program being executed by the CPU 111 and data such as processing parameters varying from time to time during execution of a program. In addition, the RAM 113 can also be used for temporarily storing information such as an event log received by the information-processing apparatus 102. The CPU 111, the ROM 112 and the RAM 113 are connected to each other by the host bus 114, which includes a CPU bus.

The host bus 114 is connected by the bridge 115 to the external bus 116 such as a PCI (Peripheral Component Interconnect/Interface) bus.

The input unit 118 includes an operation section and an input control circuit for generating an input signal and supplying the input signal to the CPU 111. The operation section typically includes a mouse, a keyboard, a touch panel, buttons, switches and a lever. By operating the input unit 118, the user of the information-processing apparatus 102 is capable of entering various kinds of data to the information-processing apparatus 102 and commands to the information-processing apparatus 102 as commands requesting the information-processing apparatus 102 to carry out processing operations.

The output unit 120 includes a display unit and a sound outputting unit such as a speaker. The display unit can be a CRT (Cathode Ray Tube) display unit, an LCD (Liquid Crystal Display) unit, an organic EL display unit and/or display lamps. The output unit 120 is a section outputting a playlist and other information. It is to be noted that the output unit 120 may also be configured to function as a controller for controlling an output unit provided externally to the information-processing apparatus 102.

The HDD 121 is a typical storage section employed in the information-processing apparatus 102 according to the embodiment as a unit for storing data. To be more specific, the HDD 121 is used to store programs to be executed by the CPU 111 and various kinds of data. The data stored in the HDD 121 includes event logs and playlists.

The drive 122 is a reader/writer of a removable storage medium. The drive 122 can be embedded in the information-processing apparatus 102 or installed externally to the information-processing apparatus 102. To be more specific, the drive 122 records various kinds of data including contents onto the removable storage medium mounted on the information-processing apparatus 102 and reads out the data from the removable storage medium. The removable storage medium can be a magnetic disk such as an HD, an optical disk such as a CD or a DVD, a magneto-optical disk such as an MO or a semiconductor memory.

To put it concretely, the drive 122 reads out data recorded on the removable storage medium, supplying the data to the RAM 113 by way of the interface 117, the external bus 116, the bridge 115 and the host bus 114. If necessary, the CPU 111 stores the data into the HDD 121 or another memory. On the other hand, the drive 122 receives data stored in the ROM 112, the HDD 121 or another memory, newly generated data and data acquired from an external apparatus via the CPU 111. Then, the drive 122 writes the data onto the removable storage medium.

The connection port 124 is a port for connecting the information-processing apparatus 102 to an external apparatus such as the content reproduction apparatus 104. The connection port 124 typically has a connection terminal such as a USB or IEEE1394 terminal. The connection port 124 is connected to the CPU 111 and other configuration elements through components such as the interface 117, the external bus 116, the bridge 115 and the host bus 114. The connection port 124 does not have to be a port for carrying out wire communications with the external apparatus, but it can also be a port for carrying out radio communications with the external apparatus. When functioning as a port for carrying radio communications with the external apparatus, the connection port 124 typically conforms to communication standards such as Bluetooth or 802.11a/b/g.

The communication unit 125 is a communication interface configured to function as a communication device for connecting the information-processing apparatus 102 to the communication network 108. The communication unit 125 exchanges various kinds of data with an external apparatus such as the service server 30 or another information-processing apparatus 102 through the communication network 108. The communication unit 125 conforms to the Ethernet and the Giga Ethernet. In an environment allowing direct communications with a radio access point to be carried out, the communication unit 125 needs merely to conform to communication standards such as Bluetooth or 802.11a/b/g.

The hardware configuration of the information-processing apparatus 102 has been explained briefly above. It is to be noted that, since the hardware configurations of the content reproduction apparatus 104 and the service server 106 are all but identical with the hardware configuration of the information-processing apparatus 102, the hardware configurations of the content reproduction apparatus 104 and the service server 106 are not explained.

<Functional Configuration of the Content Reproduction Apparatus>

Figure 3:
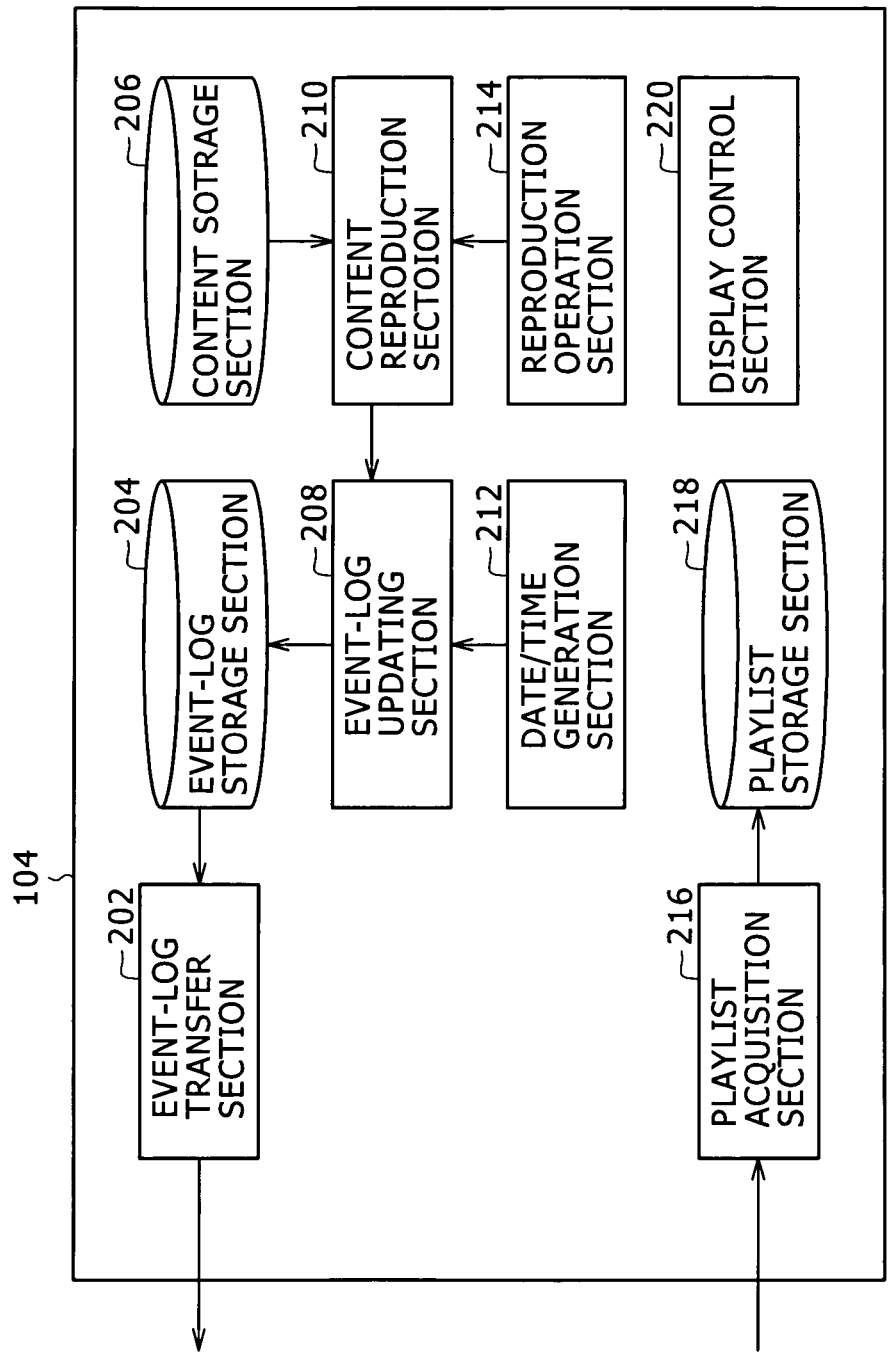
FIG. 3 is a block diagram showing the functional configuration of a content reproduction apparatus according to the embodiment.

Next, the functional configuration of the content reproduction apparatus 104 is explained by referring to FIG. 3 as follows. As shown in the figure, the content reproduction apparatus 104 includes mainly an event-log transfer section 202, an event-log storage section 204, a content storage section 206, an event-log updating section 208, a content reproduction section 210, a date/time generation section 212, a reproduction operation section 214, a playlist acquisition section 216, a playlist storage section 218 and a display control section 220.

The content storage section 206 includes a storage unit such as an HDD and has a function to store contents. A content ID is attached to every content stored in the content storage section 206 as an identifier used for uniquely identifying the content. In general, each content stored in the content storage section 206 is a content received by the content reproduction apparatus 104 from the information-processing apparatus 102. However, a content stored in the content storage section 206 may also be a content received by the content reproduction apparatus 104 from another external apparatus such as the service server 106 or another content reproduction apparatus 104.

The reproduction operation section 214 detects a reproduction operation requested by the user through an input unit of the content reproduction apparatus 104 as an operation to be carried out by the content reproduction apparatus 104 to manipulate a content and supplies information on the operation to the content reproduction section 210. Examples of a reproduction operation that can be requested by the user as an operation to be carried out by the content reproduction apparatus 104 are an operation to specify a content to be reproduced, an operation to reproduce a specified content, an operation to put a content being reproduced in a fast-forward state, an operation to put a content being reproduced in a rewind state, an operation to stop or temporarily stop reproduction of a content being reproduced and, an operation to skip a content being reproduced. The operation to skip a content being reproduced is an operation to put a content being reproduced in a fast-forward or rewind state to switch the reproduction object from the content being reproduced to another content in the course of the reproduction of the content being reproduced.

The content reproduction section 210 is a functional unit for acquiring information on a reproduction operation from the reproduction operation section 214 and carrying out processing on a content on the basis of the acquired information. The processing carried out by the content reproduction section 210 on a content may be a process to reproduce the content, a process to put the content being reproduced in a fast-forward state, a process to put the content being reproduced in a rewind state, a process to stop reproduction of the content being reproduced or another process. When the content reproduction section 210 starts a process of a content, the content reproduction section 210 reports the start of the process to the event-log updating section 208. In the following description, the start of a process carried out by the content reproduction section 210 on a content is referred to as the occurrence of an event. When the content reproduction section 210 reports the occurrence of an event to the event-log updating section 208, the content reproduction section 210 notifies the event-log updating section 208 of the type of the process and information identifying the content to be processed. The type of a process indicates that the process is a process to reproduce the content, a process to put the content being reproduced in a fast-forward state, a process to put the content being reproduced in a rewind state, a process to stop reproduction of the content being reproduced or another process. In the following description, the type of a process is referred to as an event type or the type of an event. On the other hand, the information identifying a content to be processed is typically a content ID or the ID of the content.

The date/time generation section 212 is a functional unit for generating a date/time. To put it in detail, the date/time generation section 212 acquires a date and a time from a clock embedded in the content reproduction apparatus 104 and generates date/time information including the date and the time. The date/time generation section 212 generates date/time information at a request received from the event-log updating section 208 and outputs the generated date/time information to the event-log updating section 208.

The event-log updating section 208 is a functional unit having a function to record an event on a log of events in accordance with processing carried out by the content reproduction section 210 on a content and store the log of events in the event-log storage section 204. To put it in detail, the content reproduction section 210 gives the event-log updating section 208 a notice indicating that an event has occurred. Notified by the content reproduction section 210 that an event has occurred, the event-log updating section 208 acquires a date/time from the date/time generation section 212, associates the acquired date/time with the type of the event and the ID of a content being processed, which are included in the notice, and records the date/time, the type of the event and the ID of the content on a log of events. Then, the event-log updating section 208 stores the log of events in the event-log storage section 204 as a list showing dates/times, event types and content IDs along the time axis. The event-log storage section 204 has a configuration including a storage unit such as an HDD for storing an event log generated by the event-log updating section 208. The log of events is explained by referring to FIGS. 5 to 7 as follows.

FIG. 5 is an explanatory diagram showing a relation between a log of events and reproduction operations. Reference notations CID1 and CID2 in FIG. 5 each denote the ID of a content. Reference notation Play denotes reproduction of a content and reference notation FF denotes a fast-forward state of a content being reproduced. Reference notation Pause denotes a temporary stop of a content being reproduced and reference notation Stop denotes a stop state of a content being reproduced. Reference notation t in the reproduction operations shown in FIG. 5 represents the lapse of time. Reference notations t1 to t7 each denote a date/time at which an event occurs in a reproduction operation.

Figure 5A:
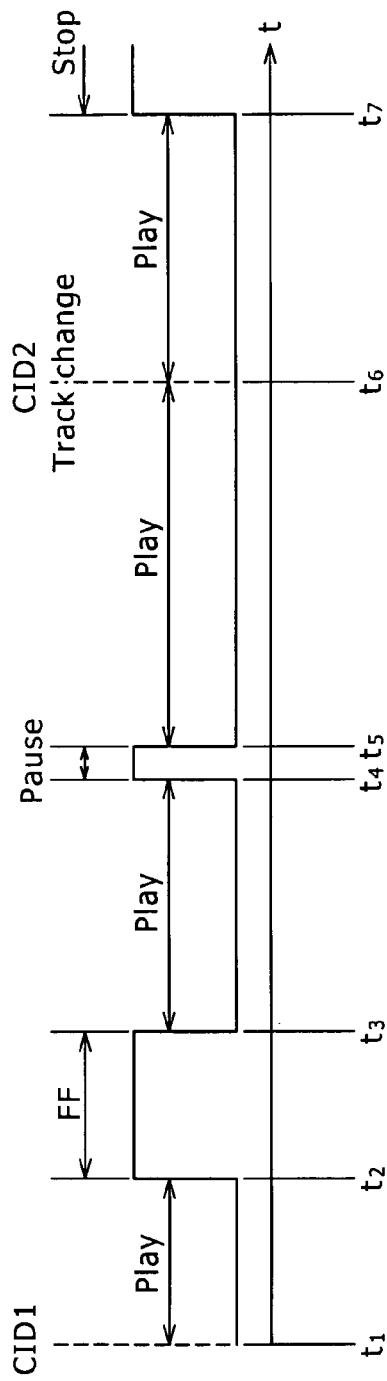
FIG. 5 is an explanatory diagram showing a relation between a log of events and reproduction operations in the embodiment.

To begin with, by referring to FIG. 5A, the following description explains reproduction operations carried out by the user and processes carried out by the content reproduction section 210 in accordance with the reproduction operations. As is obvious from an example shown in FIG. 5A, first of all, the user gives a command to the content reproduction apparatus 104 as a command to reproduce a content identified by the content ID CID1. In accordance with the command, the content reproduction section 210 starts reproduction of the content identified by the content ID CID1 at a time t1. Then, while the content identified by the content ID CID1 is being reproduced, the user gives a command to the content reproduction apparatus 104 as a command to put the content being reproduced in a fast-forward state. In accordance with the command, the content reproduction section 210 starts the fast-forward state of the content identified by the content ID CID1 at a time t2. Subsequently, as the user discontinues the fast-forward command, the content reproduction section 210 again starts reproduction of the content identified by the content ID CID1 at a time t3.

Then, while the content identified by the content ID CID1 is being reproduced, the user gives a command to the content reproduction apparatus 104 as a command to put the content being reproduced in a temporary-stop state. In accordance with the command, the content reproduction section 210 starts the temporary-stop state of the content identified by the content ID CID1 at a time t4. Subsequently, as the user discontinues the temporary-stop command, the content reproduction section 210 again starts reproduction of the content identified by the content ID CID1 at a time t5, which is the time at which the user discontinues the temporary-stop command. Then, at a time t6, the content reproduction section 210 starts reproduction of a content identified by the content ID CID2 without receiving a command from the user. The start of the reproduction of the content identified by the content ID CID2 without receiving a command implies that the content identified by the content ID1 has been reproduced till the end of the data of the content and, thereafter, the content reproduction section 210 automatically starts the reproduction of the content identified by the content ID CID2, which is a content ID following the content ID CID1 in a reproduction order. Then, while the content identified by the content ID CID2 is being reproduced, the user gives a command to the content reproduction apparatus 104 as a command to stop the reproduction of the content being reproduced. In accordance with the command, the content reproduction section 210 stops the reproduction of the content identified by the content ID CID1 at a time t7.

As described above, the content reproduction section 210 starts a variety of processes for a content in accordance with reproduction operations carried out by the user on the content. After starting a certain process referred to as a first process in accordance with a command entered by the user as a command for the first process, the content reproduction section 210 continuously carries out the first process till a next process referred to as a second process is started in accordance with a command entered by the user as a command for the second process. In the example shown in FIG. 5A, the content reproduction section 210 carries out a reproduction process in the period between the times t1 and t2, a fast-forward process in the period between the times t2 and t3, a reproduction process in the period between the times t3 and t4, a temporary-stop process in the period between the times t4 and t5 and reproduction processes in the period between the times t5 and t7.

Figure 5B:
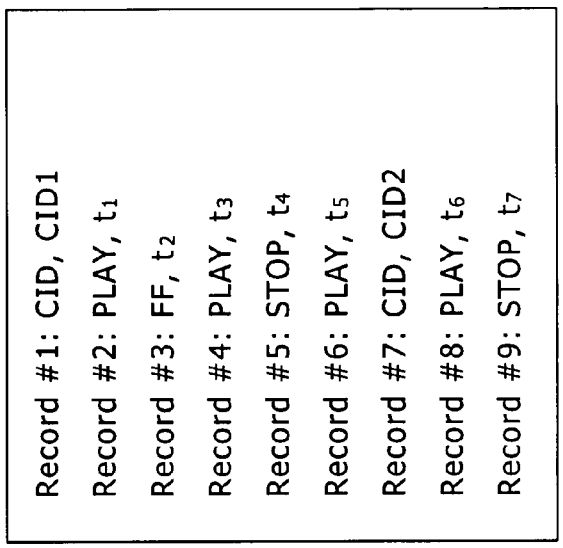

The start of each process carried out by the content reproduction section 210 is reported to the event-log updating section 208 as the occurrence of an event. Every time an event occurs, the event-log updating section 208 writes a record for the event on an event log stored in the event-log storage section 204 in order to update the event log. The log of events shows a record written for each event. The records are written on the log of events in a chronological order of the events occurring with the lapse of time. The log of events also shows the ID of each content processed upon the occurrences of events. The log of events each occurring at the beginning of one of the reproduction operations shown in FIG. 5A is shown in FIG. 5B. As indicated in FIG. 5B, the log of events shows records #1 to #9 each associated with the occurrence of an event except that records #1 and 7 each identify the content ID of a content to be processed. Thus, in the event-log storage section 204, after a record identifying the content ID of a content to be processed, records are stored in the chronological order of events related to the content to show dates/times t1 to t7 of the occurrences of the events as well as event types such as PLAY, FF and STOP.

Figure 7:
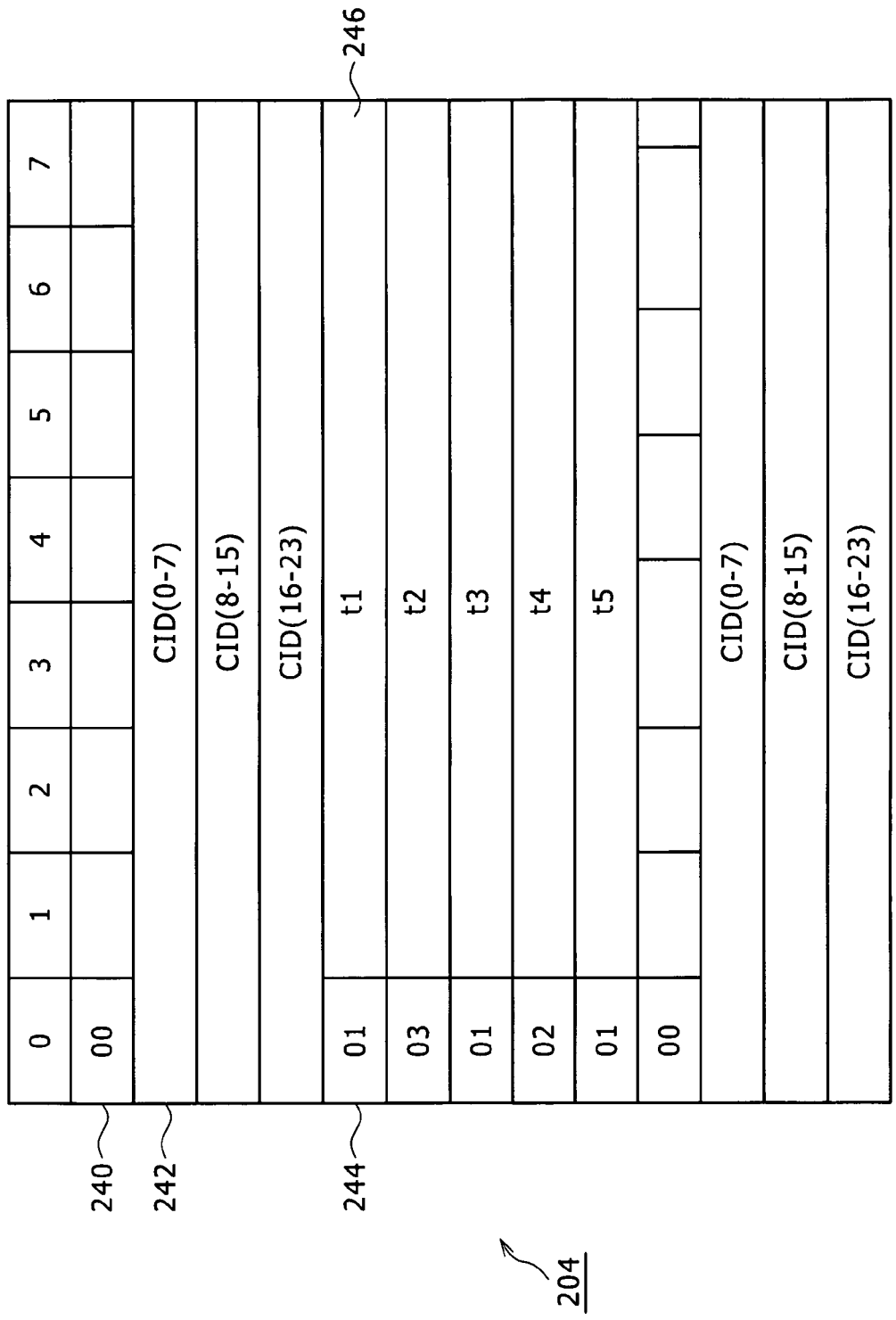
FIG. 7 is an explanatory diagram a typical format of the event log according to the embodiment.
Figure 12:
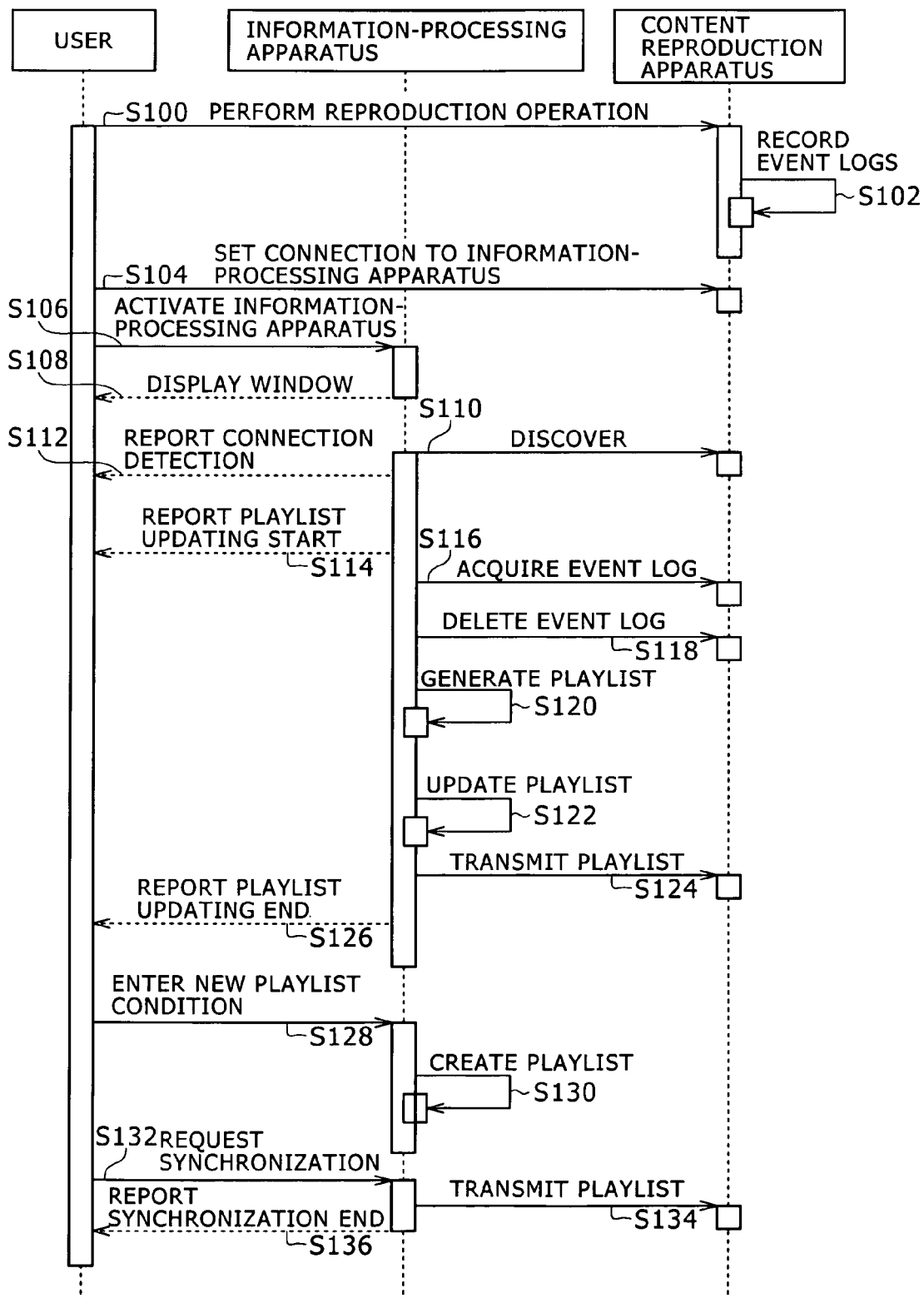
FIG. 12 shows a timing chart for flows of processing carried out by the information-processing apparatus and the content reproduction apparatus in accordance with the embodiment by associating the processing with operations carried out by the user.

FIG. 7 is an explanatory diagram showing a typical data format of the event log stored in the event-log storage section 204. To be more specific, the figure shows typical records stored in the event-log storage section 204 in the data format as the records of the event log shown in FIG. 5B. As shown in FIG. 7, the log of events is stored in the event-log storage section 204 in eight-byte units. The first byte denoted by reference numeral 240 or 244 in the figure is used for storing an event ID (representing the type of an event) such as 00, 01, 02 or 03. The event type stored in the first byte 240 is followed by a content ID 242. On the other hand, the event type stored in the first byte 244 is followed by a date/time 246.

Figure 6:
FIG. 6 is an explanatory diagram referred to in explanation of the event log according to the embodiment.

The event type also referred to as an event ID is explained by referring to FIG. 6 as follows. The event ID 230 shown in the figure is an ID used for identifying the type of an event. Each of the event IDs 230 is associated with the substance 232 of a process as follows. An event ID of 00 indicates that the event is a request for the start of a content. An event ID of 01 indicates that the event is the start of a normal reproduction process. An event ID of 02 indicates that the event is the start of a stop process or the start of a temporary-stop process. An event ID of 03 indicates that the event is the start of a fast-forward process. An event ID of 04 indicates that the event is the start of a rewind process. Each record on the event log shown in FIG. 5B corresponds to pieces of data shown in FIG. 7 as follows.

Record #1 on the event log shown in FIG. 5B corresponds to the event ID 00 stored in the first byte 240 in a word having a size of eight bytes and a content ID stored in the following three words 242 each having a size of eight bytes as shown in FIG. 7. To put it in detail, in this embodiment, a content ID has a length of 24 bytes. Thus, seven bytes included in the word as the second to eighth bytes immediately following the first byte 242 used for storing the event ID of 00 are not used.

Instead, the content ID is stored in the three words having a total length of 24 bytes (=3×8 bytes) immediately following the unused seven bytes.

Record #2 on the event log shown in FIG. 5B corresponds to the event ID 01 stored in the first byte 244 in a word and a date/time t1 stored in the seven bytes 246 of the same word as shown in FIG. 7. To be more specific, the date/time is stored in the second to eighth bytes of the same word as the event ID.

By the same token, record #3 on the event log shown in FIG. 5B corresponds to the event ID 03 stored in the first byte in a word and a date/time t2 stored in the seven bytes of the same word as shown in FIG. 7. Thereafter, in the same way, records #4 to #9 on the event log shown in FIG. 5B are stored in the event-log storage section 204 in the data format shown in FIG. 7.

FIG. 8 is an explanatory diagram showing operation categories each representing reproduction operations carried out by the user by associating each of the categories with an event log generated for the reproduction operations represented by the category. The content reproduction apparatus 104 employs typically buttons serving as a command input section. By operating one of the buttons, the user is capable of giving a Next, Search, Prev, Repeat, Pause, Rew or FF command to the content reproduction apparatus 104. The Next command given in the course of reproduction of a content is a command to reproduce the next content included in a reproduction order as a content immediately following the content currently being reproduced. The Search command is a command to reproduce a content found in a search process. The Prev command given in the course of reproduction of a content is a command to reproduce the immediately preceding content included in a reproduction order as a content immediately preceding the content currently being reproduced. The Repeat command given in the course of reproduction of no content is a command to reproduce a content most recently reproduced. On the other hand, the Repeat command given in the course of reproduction of a content is a command to again reproduce the content currently being reproduced. The Pause command is a command to temporarily stop reproduction of a content being reproduced currently. The Rew command is a command to rewind a content being reproduced currently. The FF command is a command to fast forward a content being reproduced currently.

A Rew command to the immediately preceding content is a Rew command to rewind a content being reproduced currently and then switch the object of reproduction from the content being reproduced to another content immediately preceding the content being reproduced. By the same token, an FF command to the immediately following content is an FF command to fast forward a content being reproduced currently and then switch the object of reproduction from the content being reproduced to another content immediately following the content being reproduced. In other words, the Rew command to the immediately preceding content and the FF command to the immediately following content each correspond to a command issued by the user to skip a content currently being reproduced.

If the user carries out a reproduction operation to enter a Next or Search command, as shown in the figure, after a Stop (stopping reproduction) event of a reproduced content identified by a content ID CID1 is recorded on the log of events, the content ID CID2 of a content specified in the Next or Search command is recorded to be followed by a Play (starting reproduction) event.

If the user carries out a reproduction operation to enter a Prev command, as shown in the figure, after a Stop (stopping reproduction) event of a reproduced content identified by a content ID CID1 is recorded on the log of events, the content ID CID1 of a content specified in the Prev command is recorded to be followed by a Play (starting reproduction) event.

If the user carries out a reproduction operation to enter a Repeat command, as shown in the figure, after a Stop (stopping reproduction) event of a reproduced content identified by a content ID CID1 is recorded on the log of events, the content ID CID1 of a content specified in the Repeat command as a content to be reproduced again is recorded to be followed by a Play (starting reproduction) event.

If the user carries out a reproduction operation to enter a Pause command, as shown in the figure, after a Stop (stopping reproduction) event of a reproduced content identified by a content ID CID1 is recorded on the log of events, a Play (starting reproduction) event is recorded to indicate the start of reproduction of a content to be again reproduced at the end of a Pause state.

If the user carries out a reproduction operation to enter a Rew command, as shown in the figure, after a Stop (stopping reproduction) event of a reproduced content identified by a content ID CID1 is recorded on the log of events at the start of a Rew state, a Play (starting reproduction) event is recorded to indicate the start of reproduction of a content to be again reproduced at the end of the Rew state. An FF command is handled in the same way as the Rew command.

If the user carries out a reproduction operation to enter a Rew command to the immediately preceding content, as shown in the figure, after a Stop (stopping reproduction) event of a reproduced content identified by a content ID CID1 is recorded on the log of events at the start of a Rew state, the content ID CID2 of a content to be again reproduced at the end of the Rew state is recorded to be followed by a Play (starting reproduction) event. An FF command to the immediately following content is handled in the same way as the Rew command to the immediately preceding content.

The log of events has been described above in detail. By including the substance of each process carried out on an involved content and the start time of the process in a record on the log of events as described above, the content reproduction apparatus 104 is capable of reflecting the state of a reproduction operation carried out by the user on a content on the log of events. The state of a reproduction operation carried out by the user on a content includes timings of reproduction processes requested by the user as reproductions of the content, the number of reproduction processes requested by the user, the number of Rewind processes carried out in the course of reproduction of the content, the number of fast-forward processes carried out in the course of reproduction of the content and the number of processes to skip the content.

Let us refer back to FIG. 3 and continue the explanation of the functional configuration of the content reproduction apparatus 104. The event-log transfer section 202 is a functional unit for transmitting an event log stored in the event-log storage section 204 to the information-processing apparatus 102. To put it in detail, the event-log transfer section 202 receives a request for a log of events from the information-processing apparatus 102 connected to the content reproduction apparatus 104, reads out the requested log of events from the event-log storage section 204 and transmits the log of events to the information-processing apparatus 102.

The playlist acquisition section 216 is a functional unit for acquiring a playlist from the information-processing apparatus 102. The playlist will be explained later by referring to FIG. 4. The playlist acquisition section 216 stores a playlist acquired from the information-processing apparatus 102 in the playlist storage section 218. The playlist storage section 218 has a configuration including a storage unit such as an HDD used for storing playlists.

The display control section 220 is a functional unit for controlling a process to display information on a display unit employed in the content reproduction apparatus 104. To put in detail, the display control section 220 controls a process to display a playlist stored in the playlist storage section 218 on the display unit. Typical screens each showing a playlist will be described later by referring to FIGS. 22 to 24. It is to be noted that the content reproduction apparatus 104 can also be integrated with the display unit to form a single assembly. The functional configuration of the content reproduction apparatus 104 has been explained above.

<Functional Configuration of the Information-Processing Apparatus>

Figure 4:
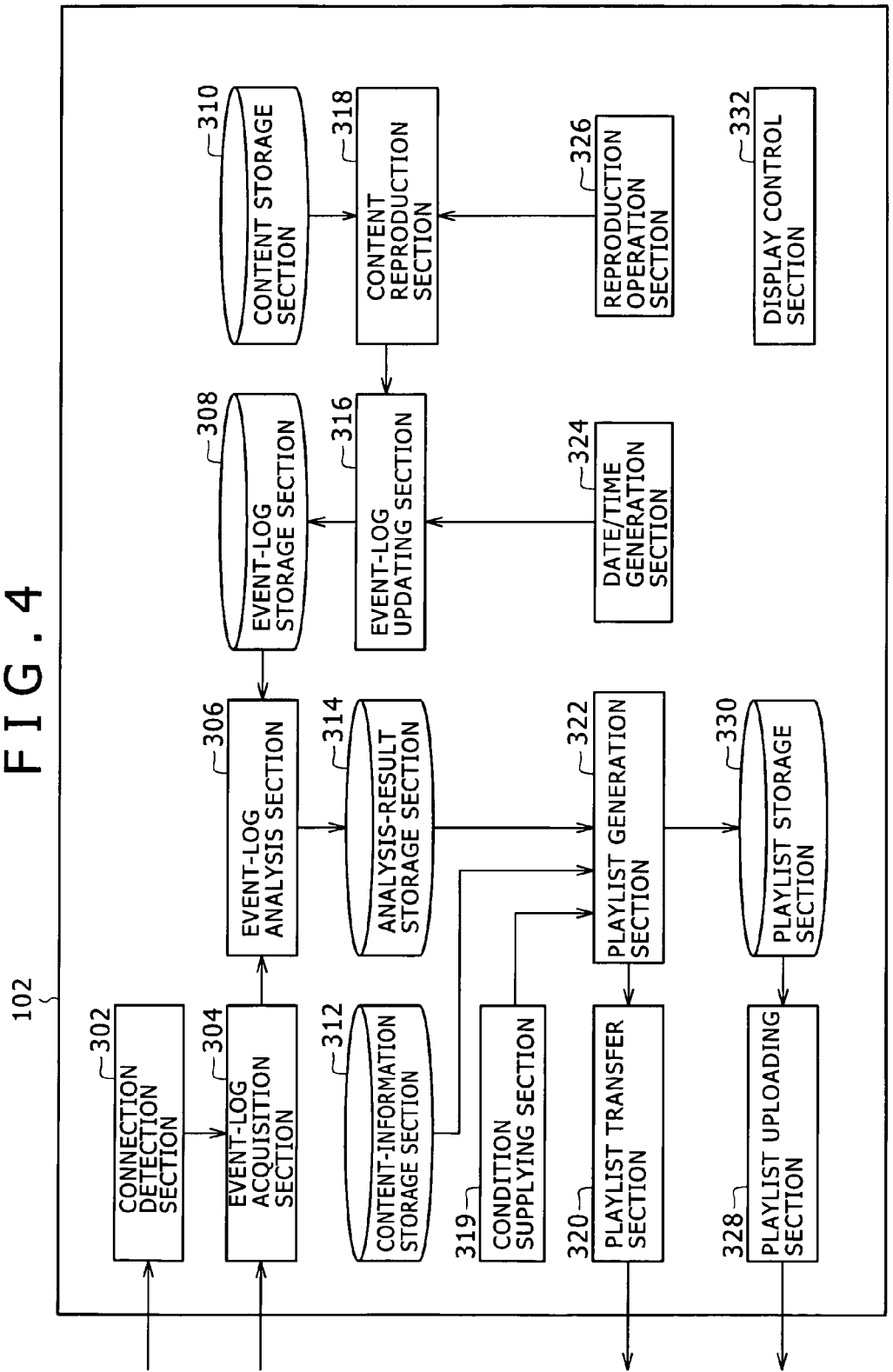
FIG. 4 is a block diagram showing the functional configuration of the information-processing apparatus according to the embodiment.

Next, the functional configuration of the information-processing apparatus 102 is explained by referring to FIG. 4. As shown in the figure, the information-processing apparatus 102 mainly includes a connection detection section 302, an event-log acquisition section 304, an event-log analysis section 306, an event-log storage section 308, a content storage section 310, a content-information storage section 312, an analysis-result storage section 314, an event-log updating section 316, a content reproduction section 318, a condition supplying section 319, a playlist transfer section 320, a playlist creation section 322, a date/time generation section 324, a reproduction operation section 326, a playlist-uploading section 328, a playlist storage section 330 and a display control section 332.

Since the content storage section 310, the content reproduction section 318, the reproduction operation section 326, the date/time generation section 324, the event-log updating section 316 and the event-log storage section 308 have all but the same functions as respectively the content storage section 206, the content reproduction section 210, the reproduction operation section 214, the content-information storage section 212, the event-log updating section 208 and the event-log storage section 204, which are employed in the content reproduction apparatus 104, the content reproduction section 318, the reproduction operation section 326, the date/time generation section 324, the event-log updating section 316 and the event-log storage section 308 are not explained. Much like the content reproduction apparatus 104, the information-processing apparatus 102 is capable of carrying out processes each according to a reproduction operation performed by the user as well as creating and storing a log of events for the processes.

The connection detection section 302 is a functional unit for detecting connection of the information-processing apparatus 102 with another computer. To put it concretely, the connection detection section 302 detects connection of a content reproduction apparatus 104 to the connection port 124 and notifies the event-log acquisition section 304 that a content reproduction apparatus 104 has been connected to the connection port 124.

Notified by the connection detection section 302 that a content reproduction apparatus 104 has been connected to the connection port 124, the event-log acquisition section 304 acquires a log of events from the content reproduction apparatus 104. The event-log acquisition section 304 then supplies the event log received from the content reproduction apparatus 104 to the event-log analysis section 306.

The event-log analysis section 306 is a functional unit for analyzing an event log stored in the event-log storage section 308 and an event log received by the event-log acquisition section 304 from the content reproduction apparatus 104. In the following description, an event log stored in the event-log storage section 308 is referred to as an event log of the information-processing apparatus 102 whereas an event log received by the event-log acquisition section 304 from the content reproduction apparatus 104 is referred to as an event log of the content reproduction apparatus 104. In addition, both an event log stored in the event-log storage section 308 and an event log received by the event-log acquisition section 304 from the content reproduction apparatus 104 are denoted simply by an event log, which is a generic technical term for both the event logs, in case it is not necessary to distinguish an event log stored in the event-log storage section 308 and an event log received by the event-log acquisition section 304 from the content reproduction apparatus 104 from each other.

To put it concretely, from a log of events, the event-log analysis section 306 finds the reproduction start date/time, the reproduction end date/time, the number of reproductions, the number of pauses, the number of skips, the number of repeats and a total reproduction duration for each content. The event-log analysis section 306 is capable of finding the reproduction start date/time of a content identified by a content ID by extracting a reproduction date/time from a record immediately following a record showing the content ID on the log of events.

In addition, the event-log analysis section 306 is capable of finding the reproduction end date/time of a content by extracting a date/time from a record including information on a reproduction stop of the content or a record including a reproduction start date/time of the immediately following content. To put it in detail, a content reproduction stop record immediately preceding a record of a content ID on the log of events is a record put on the log of events to indicate the end of the reproduction of the content stopped due to occurrence of a reproduction stop event. Thus, the date/time of a content reproduction stop record immediately preceding a record of a content ID on the log of events is the reproduction end date/time of a content stopped due to occurrence of a reproduction stop event.

If a record including information on a reproduction stop of a content does not exist at a location immediately preceding a record of a content ID on the log of events, a record provided at a location immediately succeeding a record of a content ID as a record including a reproduction start of a content is a record showing the reproduction start of a new content or the reproduction end of a content immediately preceding the new content. Thus, if a record including information on a reproduction stop of a content does not exist at a location immediately preceding a record of a content ID on the log of events, the event-log analysis section 306 extracts the date/time included in a specific record provided at a location immediately succeeding a record of a content ID as a specific record including a reproduction start of a new content and takes the extracted date/time, which is the reproduction start date/time of the new content, as the reproduction end date/time of a content immediately preceding the new content.

In addition, on the basis of records each provided at a location immediately succeeding a record of a content ID on the log of events as a record including a reproduction start of a content, the event-log analysis section 306 is capable of finding the number of reproductions. On top of that, on the basis of an event log generated in accordance with reproduction operations as shown in FIG. 8, the event-log analysis section 306 is capable of finding the number of pauses, the number of skips and the number of repeats for each content. In addition, the event-log analysis section 306 is also capable of finding the total reproduction duration of each content by extracting records relevant to the content from the log of events and summing up periods each sandwiched between a reproduction start time and reproduction end time of the content. Processes carried out by the event-log analysis section 306 to find the number of reproductions, the number of pauses, the number of skips of each content, the number of repeats for each content and the total reproduction duration of the content will be explained later by referring to flowcharts shown in FIGS. 15 to 20.

After completing analyses, the event-log analysis section 306 supplies results of the analyses to the analysis-result storage section 314. The analysis-result storage section 314 has a configuration including an HDD serving as a storage unit. The analysis-result storage section 314 is a memory used for storing results of a process carried out by the event-log analysis section 306 to analyze a log of events. To put it in detail, the analysis results supplied to the analysis-result storage section 314 typically include various kinds of information such as the number of reproductions, the number of pauses, the number of skips, the number of repeats and the total reproduction duration for each content. In addition, the analysis results supplied to the analysis-result storage section 314 may also include information such as the reproduction start date/time of each content, the reproduction end date/time of each content and each of continuous reproduction durations for every content. The analysis results stored in the analysis-result storage section 314 are explained by referring to FIGS. 10 and 11 as follows.

FIGS. 10 and 11 are each an explanatory diagram showing typical analysis results recorded in the analysis-result recording section 314. To be more specific, FIG. 10 shows data stored in the analysis-result storage section 314 as results of a process carried out by the event-log analysis section 306 to analyze reproduction states recorded on a log of events for contents. The data stored in the analysis-result storage section 314 is referred to hereafter as a reproduction state table. As shown in FIG. 10, each row of the reproduction state table stored in the analysis-result storage section 314 includes a content ID (CID) 350, a reproduction count 362, a pause count 364, a skip count 366, a repeat count 368 and a total reproduction duration 370.

If the event log analyzed by the analysis-result storage section 314 is an event log of an information-processing apparatus 102, the reproduction state table includes a content ID (CID) 350, a reproduction count 362, a pause count 364, a skip count 366, a repeat count 368 and a total reproduction duration 370, which are provided for every content reproduced in the information-processing apparatus 102. If the event log analyzed by the analysis-result storage section 314 is an event log of a content reproduction apparatus 104, on the other hand, the reproduction state table includes a content ID (CID) 350, a reproduction count 362, a pause count 364, a skip count 366, a repeat count 368 and a total reproduction duration 370, which are provided for every content reproduced in the content reproduction apparatus 104. If the event logs analyzed by the analysis-result storage section 314 are event logs of an information-processing apparatus 102 and a content reproduction apparatus 104, the reproduction state table includes a content ID (CID) 350, a reproduction count 362, a pause count 364, a skip count 366, a repeat count 368 and a total reproduction duration 370, which are provided for every content reproduced in at least the information-processing apparatus 102 or the content reproduction apparatus 104. For a content reproduced in both an information-processing apparatus 102 and a content reproduction apparatus 104, the reproduction state table of the analysis-result storage section 314 includes sums each obtained by adding a value representing the reproductions in the information-processing apparatus 102 to a value representing the reproductions in the content reproduction apparatus 104. For example, in this case, the reproduction state table of the analysis-result storage section 314 includes a sum obtained by adding a reproduction count for the information-processing apparatus 102 to a reproduction count for the content reproduction apparatus 104.

The content ID 350 of a content is an identifier used for uniquely identifying the content. The reproduction count 362 on the same row as the content ID 350 is the number of times the content identified by the content ID 350 has been reproduced. The pause count 364 on the same row as the content ID 350 is the number of times the content identified by the content ID 350 has been put in a pause state in the course of the reproduction of the content. The skip count 366 on the same row as the content ID 350 is the number of times the content identified by the content ID 350 has been skipped in the course of the reproduction of the content. The repeat count 368 on the same row as the content ID 350 is the number of times the content identified by the content ID 350 has been reproduced repeatedly. The total reproduction duration 370 on the same row as the content ID 350 is the total of reproduction periods of the content identified by the content ID 350. Let us keep in mind that it is desirable to have a total reproduction duration 370 representing the total of actual reproduction periods of a content. That is to say, it is desirable to have a total reproduction duration 370 that does not include a fast-forward period, a rewind period and a period during which the reproduction is stopped.

FIG. 11 shows data stored in the analysis-result storage section 314 as results of a process carried out by the event-log analysis section 306 to analyze records put on a log of events for contents. In this case, the data stored in the analysis-result storage section 314 is referred to hereafter as a reproduction history table. The life of a content from a reproduction-start event to a reproduction-end event associated with the reproduction-start event forms a reproduction history. A reproduction-start event is a record put on a log of events as a record immediately following a content-ID record. As shown in FIG. 11, the reproduction history table stored in the analysis-result storage section 314 includes a content ID 350, a reproduction start date/time 372, a reproduction end date/time 373 and a reproduction duration 374, which are associated with each other for each row of the reproduction history table.

If the event log analyzed by the analysis-result storage section 314 is an event log of an information-processing apparatus 102, the reproduction history table includes a content ID 350, a reproduction start date/time 372, a reproduction end date/time 373 and a reproduction duration 374, which are provided for every content reproduced in the information-processing apparatus 102. If the event log analyzed by the analysis-result storage section 314 is an event log of a content reproduction apparatus 104, on the other hand, the reproduction history table includes a content ID 350, a reproduction start date/time 372, a reproduction end date/time 373 and a reproduction duration 374, which are provided for every content reproduced in the content reproduction apparatus 104. If the event logs analyzed by the analysis-result storage section 314 are event logs of an information-processing apparatus 102 and a content reproduction apparatus 104, the reproduction history table includes a content ID 350, a reproduction start date/time 372, a reproduction end date/time 373 and a reproduction duration 374, which are provided for every content reproduced in either the information-processing apparatus 102 or the content reproduction apparatus 104.

The content ID 350 of a content is an identifier used for uniquely identifying the content. The reproduction start date/time 372 on the same row as the content ID 350 is a date/time at which a reproduction of the content identified by the content ID 350 has been started. To put in detail, the reproduction start date/time 372 is a date/time included in a reproduction start record immediately following the record of a content ID identifying the content on the log of events. The reproduction end date/time 373 on the same row as the content ID 350 is a date/time at which a reproduction of the content identified by the content ID 350 has been ended after a reproduction start date/time specified by the reproduction start date/time 372 on the same row. A reproduction end date/time 373 can be found as described above. The reproduction duration 374 on the same row as the content ID 350 is a reproduction period since a reproduction start date/time specified by the reproduction start date/time 372 on the same row. It is possible to provide a configuration in which the reproduction duration 374 does not include a fast-forward period, a rewind period and a period during which the reproduction is stopped. To put it in detail, the reproduction duration 374 can be found by subtracting the reproduction start date/time 372 from the reproduction end date/time 373 found by adoption of the method described earlier to give a difference and further subtracting a fast-forward period, a rewind period and a period during which the reproduction is stopped from the difference.

Analysis results stored in the analysis-result storage section 314 have been described above. Let us refer back to FIG. 4 to continue the explanation of the functional configuration of the information-processing apparatus 102. The playlist creation section 322 is a functional unit for generating a playlist as a list identifiers, which are used for identifying contents satisfying a predetermined condition, on the basis of event-log analysis results stored in the analysis-result storage section 314.

As mentioned above, a playlist is a list of identifiers used for identifying contents satisfying a predetermined condition. The information-processing apparatus 102 and the content reproduction apparatus 104 are each capable of reproducing contents each identified by an identifier put on the playlist in an order conforming to the playlist. Thus, if the information-processing apparatus 102 or the content reproduction apparatus 104 has a playlist of contents each serving as a favorite with the user, the information-processing apparatus 102 or the content reproduction apparatus 104 is capable of reproducing contents each serving as a favorite with the user by reproducing the contents in an order conforming to the playlist.

The identifier put on a playlist as the identifier of a content is not limited to a content ID used for uniquely identifying the content, but it can also be the title of the content, information on an artist associated with the content or another attribute of the content. The playlist creation section 322 is capable of acquiring attributes identifying a content from the content-information storage section 312. To put it in detail, the playlist creation section 322 extracts the ID of a content satisfying a predetermined condition from the analysis-result storage section 314 and collates the extracted ID with content IDs stored in the content-information storage section 312. Then, the playlist creation section 322 retrieves the attributes of a content having its ID matching the extracted ID from the content-information storage section 312. The content-information storage section 312 is used for storing attributes of each content. The attributes stored in the content-information storage section 312 as the attributes of a content are explained by referring to FIG. 9 as follows.

As shown in FIG. 9, each row of the content-information storage section 312 includes pieces of information such as a CID (content ID) 350, a content title 352, an artist name 354, an album name 356, a genre 358 and a performance duration 360. The content ID 350 of a content is an identifier used for uniquely identifying the content. The content title 352 is the title of a piece of music performed by reproduction of the content identified by the CID (content ID) 350. The artist name 354 is the name of an artist performing the piece of music. The album name 356 is the name of an album serving as a collection of contents including the piece of music. The genre 358 is a genre to which the piece of music pertains. Examples of the genre 358 are the jazz, the pops and the rock. The performance duration 360 is the time it takes to perform the piece of music.

In a process to generate a playlist, the playlist creation section 322 searches the content-information storage section 312 for the CID (content ID) 350 of every content to be put on the playlist. Then, the playlist creation section 322 retrieves attributes including the CID (content ID) 350 found in the search process and the content title 352, the artist name 354, the album name 356, the genre 358 and the performance duration 360, which are associated with the content ID 350, from the content-information storage section 312. Subsequently, the playlist creation section 322 may put the retrieved attributes on the playlist for the content. Pieces of information stored in the content-information storage section 312 as the attributes of every content have been described above. Let us refer back to FIG. 4 to continue the explanation of the information-processing apparatus 102.

The playlist creation section 322 generates a playlist of contents each satisfying a predetermined condition, which can be, for example, a period in which the content was reproduced, a total reproduction duration exceeding a predetermined value, a reproduction count exceeding a predetermined value, a skip count smaller than a predetermined value, a pause count smaller than a predetermined value or a repeat count exceeding a predetermined value.

First of all, the description explains a process to create a playlist of contents each reproduced during a predetermined period of time in the past as the predetermined condition. The playlist creation section 322 is capable of creating a playlist, which is to serve as a collection of attributes of every content reproduced during a specific period of time in the past, on the basis of dates/times stored in the reproduction-history table of the analysis-result storage section 314 as the reproduction start date/time and reproduction end date/time of the content. Examples of the specific period of time are the month of April 2005 and a period from Dec. 23, 2004 to Dec. 25, 2004. The user may enter the specific period of time to the information-processing apparatus 102 via the input unit 118 employed in the information-processing apparatus 102, or the condition supplying section 319 may supply the specific period of time to the playlist creation section 322. To put it more concretely, the playlist generation section 322 extracts attributes from the analysis-result storage section 314 as attributes of contents each having at least a reproduction start date/time or a reproduction end date/time falling within the entered specific period of time. Then, the playlist generation section 322 creates a playlist serving as a set of attributes extracted from the analysis-result storage section 314.

Next, the description explains a process to create a playlist of contents by using the total reproduction duration as the predetermined condition. The playlist generation section 322 is capable of creating a playlist serving as a set of attributes of contents each having a total reproduction duration exceeding a predetermined length on the basis of total reproduction durations stored in a reproduction-state table of the analysis-result storage section 314 as the total reproduction durations of the contents. The user may enter the predetermined length via the input unit 118 employed in the information-processing apparatus 102, or the condition supplying section 319 may supply the predetermined length to the playlist creation section 322. It is to be noted that the playlist generation section 322 is also capable of creating a playlist serving as a set of attributes of a predetermined number of contents arranged in an order of increasing or decreasing total reproduction durations on the basis of the total reproduction durations of the contents.

Next, the description explains a process to create a playlist of contents by using the reproduction count as the predetermined condition. The playlist generation section 322 is capable of creating a playlist serving as a set of attributes of contents each having a reproduction count not smaller than a predetermined reproduction count on the basis of reproduction counts stored in a reproduction-state table of the analysis-result storage section 314 as the reproduction counts of the contents. The user may enter the predetermined reproduction count via the input unit 118 employed in the information-processing apparatus 102, or the condition supplying section 319 may supply the predetermined reproduction count to the playlist creation section 322. It is to be noted that the playlist generation section 322 is also capable of creating a playlist serving as a set of attributes of a predetermined number of contents arranged in an order of increasing or decreasing reproduction counts on the basis of the reproduction counts of the contents.

Next, the description explains a process to create a playlist of contents by using the skip count as the predetermined condition. The playlist generation section 322 is capable of creating a playlist serving as a set of attributes of contents each having a skip count not exceeding a predetermined skip count on the basis of skip counts stored in a reproduction-state table of the analysis-result storage section 314 as the skip counts of the contents. The user may enter the predetermined skip count via the input unit 118 employed in the information-processing apparatus 102, or the condition supplying section 319 may supply the predetermined skip count to the playlist creation section 322. It is to be noted that the playlist generation section 322 is also capable of creating a playlist serving as a set of attributes of a predetermined number of contents arranged in an order of increasing or decreasing skip counts on the basis of the skip counts of the contents.

Next, the description explains a process to create a playlist of contents by using the pause count as the predetermined condition. The playlist generation section 322 is capable of creating a playlist serving as a set of attributes of contents each having a pause count not greater than a predetermined pause count on the basis of pause counts stored in a reproduction-state table of the analysis-result storage section 314 as the pause counts of the contents. The user may enter the predetermined pause count via the input unit 118 employed in the information-processing apparatus 102, or the condition supplying section 319 may supply the predetermined skip count to the playlist creation section 322. It is to be noted that the playlist generation section 322 is also capable of creating a playlist serving as a set of attributes of a predetermined number of contents arranged in an order of increasing or decreasing pause counts on the basis of the pause counts of the contents.

Next, the description explains a process to create a playlist of contents by using the repeat count as the predetermined condition. The playlist generation section 322 is capable of creating a playlist serving as a set of attributes of contents each having a repeat count not smaller than a predetermined repeat count on the basis of repeat counts stored in a reproduction-state table of the analysis-result storage section 314 as the repeat counts of the contents. The user may enter the predetermined repeat count via the input unit 118 employed in the information-processing apparatus 102, or the condition supplying section 319 may supply the predetermined repeat count to the playlist creation section 322. It is to be noted that the playlist generation section 322 is also capable of creating a playlist serving as a set of attributes of a predetermined number of contents arranged in an order of increasing or decreasing repeat counts on the basis of the repeat counts of the contents.

In addition, the playlist generation section 322 may also create a playlist serving as a set of attributes of contents each inferred as a content serving as a favorite with the user on the basis of all the total reproduction duration, the number of reproductions, the number of skips, the number of pauses and the number of repeats, which are described above. To put it concretely, the playlist generation section 322 is capable of creating a playlist serving as a set of attributes of contents each inferred as a content serving as a favorite with the user by, for example, selecting contents that each have a relatively long total reproduction duration, a relatively large reproduction count, a relatively large repeat count, a relatively small skip count and a relatively small pause count.

As described above, by generating a number of playlists each based on results of analyzing event logs each reflecting states of reproduction operations carried out by the user on contents, the playlist generation section 322 is capable of reflecting the reproduction operations carried out by the user on the playlists.

It is to be noted that, if the analysis result stored in the analysis-result storage section 314 is a result of analyzing a log of events in an information-processing apparatus 102, a playlist generated by the playlist generation section 322 is a playlist reflecting reproduction operations carried out by the user on contents in the information-processing apparatus 102. If the analysis result stored in the analysis-result storage section 314 is a result of analyzing a log of events in a portable reproduction apparatus 104, on the other hand, a playlist generated by the playlist generation section 322 is a playlist reflecting reproduction operations carried out by the user on contents in the portable reproduction apparatus 104. If the analysis result stored in the analysis-result storage section 314 is a result of analyzing a log of events in both an information-processing apparatus 102 and a portable reproduction apparatus 104, a playlist generated by the playlist generation section 322 is a playlist reflecting reproduction operations carried out by the user on contents in both the information-processing apparatus 102 and the portable reproduction apparatus 104.

The playlist transfer section 320 transmits the playlist generated by the playlist creation section 322 to a content reproduction apparatus 104 connected to the information-processing apparatus 102. It is to be noted that the recipient of a playlist transmitted by the playlist transfer section 320 can be a content reproduction apparatus 104 connected to the information-processing apparatus 102 or a content reproduction apparatus having no function to record a log of events. By transmitting a playlist to a content reproduction apparatus having no function to record a log of events, a general content reproduction apparatus is made capable of utilizing a playlist provided by the embodiment as a playlist reflecting reproduction operations carried out by the user on a information-processing apparatus 102 or a portable reproduction apparatus 104.

It is to be noted that the information-processing apparatus 102 may be provided with a content transfer section for transmitting a content to a content reproduction apparatus 104 as one of contents each identified by a content attribute put on a playlist transmitted to the content reproduction apparatus 104. If the content to be transferred to the portable reproduction apparatus 104 is a subscribed content or, in other words, if the content to be transferred to the portable reproduction apparatus 104 is a content usable only during a predetermined season, prior to the transmission of the content, the content transfer section, which is not shown in the figure, produces a result of determination as to whether or not the predetermined season has ended on the basis of a utilization right given to the content. If the result of the determination indicates that the predetermined season has not ended, the content transfer section transmits the content to the portable reproduction apparatus 104. If the result of the determination indicates that the predetermined season has ended, on the other hand, the content transfer section does not transmit the content to the portable reproduction apparatus 104. Instead, the information-processing apparatus 102 transmits an error message or the like to the portable reproduction apparatus 104.

The playlist storage section 330 has a configuration including a storage unit such as an HDD used for storing a playlist generated by the playlist generation section 322.

The playlist-uploading section 328 is a functional unit for uploading a playlist stored in the playlist storage section 330 to the service server 106. To put it detail, as a request issued by the service server 106 to the information-processing apparatus 102 as a request to transmit a playlist generated on the basis of a predetermined condition to the service server 106, the playlist-uploading section 328 acquires the playlist from the playlist storage section 330 and transmits it to the service server 106. It is also possible to provide the information-processing apparatus 102 with a configuration in which, if the requested playlist is not stored in the playlist storage section 330, the playlist-uploading section 328 submits the predetermined condition included in the request received from the service server 106 to the playlist creation section 322. Then, the playlist creation section 322 creates a playlist on the basis of the predetermined condition. Finally, the playlist-uploading section 328 uploads the playlist to the service server 106.

The display control section 332 is a functional unit for controlling a process to display information on a display unit employed in the information-processing apparatus 102. The information displayed on the display unit by the display control section 332 may be, among others, a playlist stored in the playlist storage section 330 or a screen for inputting a condition for generation of a playlist. A typical display of a playlist will be described later by referring to FIG. 21. It is to be noted that the information-processing apparatus 102 can also be integrated with the display unit to form a single assembly. The functional configuration of the information-processing apparatus 102 has been explained above.

The service server 106 is capable of acquiring a playlist generated on the basis of a predetermined condition from an information-processing apparatus 102 and creating a new playlist on the basis of a plurality of acquired playlists. For example, the service server 106 acquires a playlist of contents reproduced during a specific period of time from every information-processing apparatus 102 and is then capable of creating a new playlist showing a predetermined number of contents by extracting the contents from the acquired playlists and arranging the extracted contents in an order of decreasing playlist counts. In this case, a playlist count of a content is defined as the number of acquired playlists each showing an attribute of the content. Thus, the order of decreasing playlist counts starts with a content having the largest number of acquires playlists. In such a configuration, the service server 106 is capable of creating a new playlist showing contents listened to by many users during the specific period. In addition, the service server 106 is also capable of transmitting the created playlist to information-processing apparatus 102 and a content reproduction apparatus 104. On top of that, the service server 106 may disclose playlists acquired from information-processing apparatus 102 at a website or the like, allowing a plurality of users to refer to the disclosed playlists.

<Information Processing Flows>

Next, flows of information processing carried out by the content reproduction apparatus 104 and the information-processing apparatus 102 are explained in the following descriptions by referring to FIGS. 12 to 20. To begin with, the flow of entire information processing carried out by the content reproduction apparatus 104 and the information-processing apparatus 102 in accordance with operations performed by the user is explained by referring to FIG. 12 as follows.

First of all, at a step S100, the user carries out a reproduction operation on the content reproduction apparatus 104. Then, at the next step S102, the information-processing apparatus 102 puts a record on a log of events as a record according to the reproduction operation. Subsequently, at the next step S104, the user connects the content reproduction apparatus 104 to the information-processing apparatus 102. Then, when the user activates the information-processing apparatus 102 at the next step S106, the information-processing apparatus 102 displays a screen such as a screen for inputting a condition for creation of a playlist or a screen showing playlists at the next step S108. Subsequently, when the information-processing apparatus 102 detects the connection with the content reproduction apparatus 104 at the next step S110, at the next step S112, the information-processing apparatus 102 notifies the user that the information-processing apparatus 102 has been connected to the content reproduction apparatus 104. Then, at the next step S114, the information-processing apparatus 102 notifies the user that a process to create and update playlists has been started. Subsequently, when the information-processing apparatus 102 receives a log of events from the content reproduction apparatus 104 at the next step S116, the information-processing apparatus 102 deletes the log of events from the content reproduction apparatus 104 at the next step S118. Then, at the next step S120, the information-processing apparatus 102 creates a playlist on the basis of the received log of events. Subsequently, at the next step S122, the information-processing apparatus 102 updates a playlist held by the information-processing apparatus 102 itself or stores the created playlist in a memory as an additional playlist. Then, at the next step S124, the information-processing apparatus 102 transmits the playlist created in the process carried out at the step S120 to the content reproduction apparatus 104. Subsequently, at the next step S126, the information-processing apparatus 102 notifies the user that the process to create and update playlists has been completed.

Then, when the user enters a condition for creation of a playlist to the information-processing apparatus 102 at the next step S128, the information-processing apparatus 102 creates a playlist on the basis of the condition entered by the user at the next step S130. Subsequently, when the user enters a synchronization command to the information-processing apparatus 102 at the next step S132, at the next step S134, the information-processing apparatus 102 transmits the playlist created in the process carried out at the step S130 to the content reproduction apparatus 104. Then, at the next step S136, the information-processing apparatus 102 notifies the user that a process according to the synchronization command has been ended.

Figure 13:
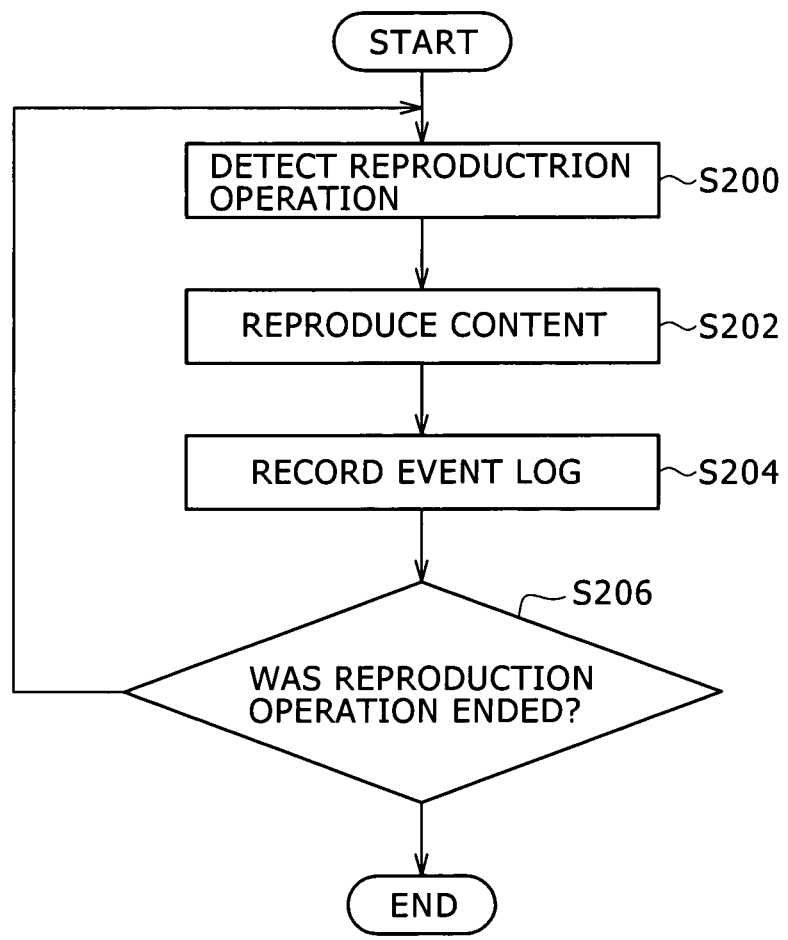
FIG. 13 shows a flowchart representing processing carried out by the content reproduction apparatus according to the embodiment.

Next, the flow of processing carried out by the content reproduction apparatus 104 to process information is explained by referring to a flowchart shown in FIG. 13. First of all, at a step S200, the content reproduction apparatus 104 detects a reproduction operation carried out by the user. Then, at the next step S202, the content reproduction apparatus 104 carries out a process to manipulate a content in accordance with the reproduction operation received in the process carried out at the step S200. The process can be a process to reproduce, fast forward, stop or rewind the content. Subsequently, at the next step S204, the content reproduction apparatus 104 puts a record of the process on a log of events. Then, at the next step S206, the content reproduction apparatus 104 produces a result of determination as to whether or not the reproduction operation carried out by the user has been ended. If the result of the determination indicates that the reproduction operation carried out by the user has been ended, the execution of the processing carried out by the content reproduction apparatus 104 is terminated. If the result of the determination indicates that the reproduction operation carried out by the user has not been ended, on the other hand, the flow of the processing goes back to the step S200 at which the content reproduction apparatus 104 continues the processing. It is to be noted that the result of the determination indicates that the reproduction operation carried out by the user has been ended, for example, when the content reproduction apparatus 104 is connected to an information-processing apparatus 102 and enters a mode to receive a content from the information-processing apparatus 102.

Figure 14:
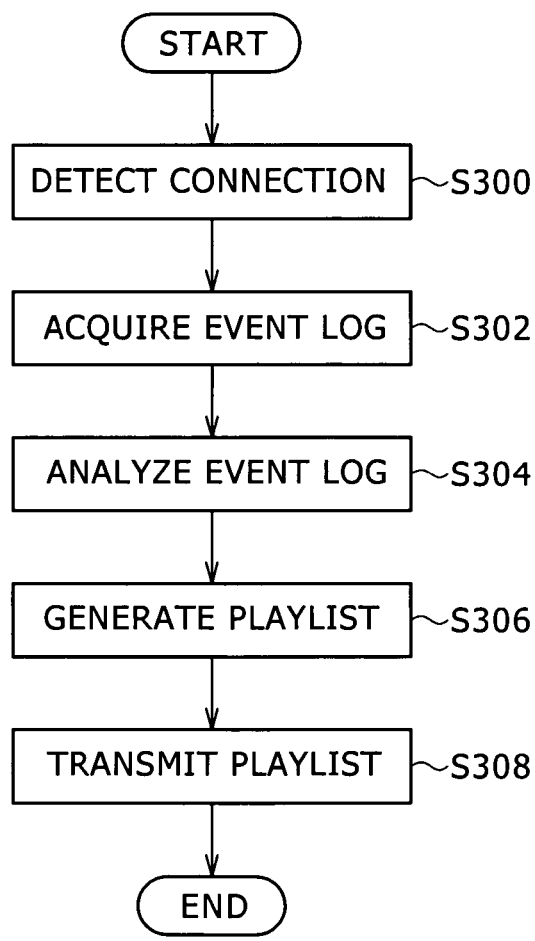
FIG. 14 shows a flowchart representing processing carried out by the information-processing apparatus according to the embodiment.

Next, the flow of processing carried out by the information-processing apparatus 102 to process information is explained by referring to a flowchart shown in FIG. 14. First of all, at a step S300, the information-processing apparatus 102 detects connection with the content reproduction apparatus 104. Then, at the next step S302 after the detection of the connection, the information-processing apparatus 102 acquires a log of events from the content reproduction apparatus 104. Subsequently, at the next step S304, the information-processing apparatus 102 analyzes the acquired log of events. Then, at the next step S306, the information-processing apparatus 102 creates a playlist on the basis of a result of the analysis. Subsequently, at the next step S308, the information-processing apparatus 102 transmits the playlist created in the process carried out at the step S306 to the content reproduction apparatus 104. Let us keep in mind that it is possible to provide the information-processing apparatus 102 with a configuration in which the information-processing apparatus 102 stores the event log received from the content reproduction apparatus 104 on a recording medium and analyses the log of events and creates a playlist later on at a request made by the content reproduction apparatus 104, the service server 106 or the user. By referring to the flowcharts shown in FIGS. 15 to 20, the following description explains details of the process carried out at the step S304 of the flowchart of FIG. 14 to analyze a log of events. Analysis-processing flows shown in FIGS. 15 to 20 are based on the assumption that records are put on the log of events in the format shown in FIG. 7. The technical term 'event-log file' used in the following description means a file for storing a plurality of event-log records in the format shown in FIG. 7.

Figure 15A:
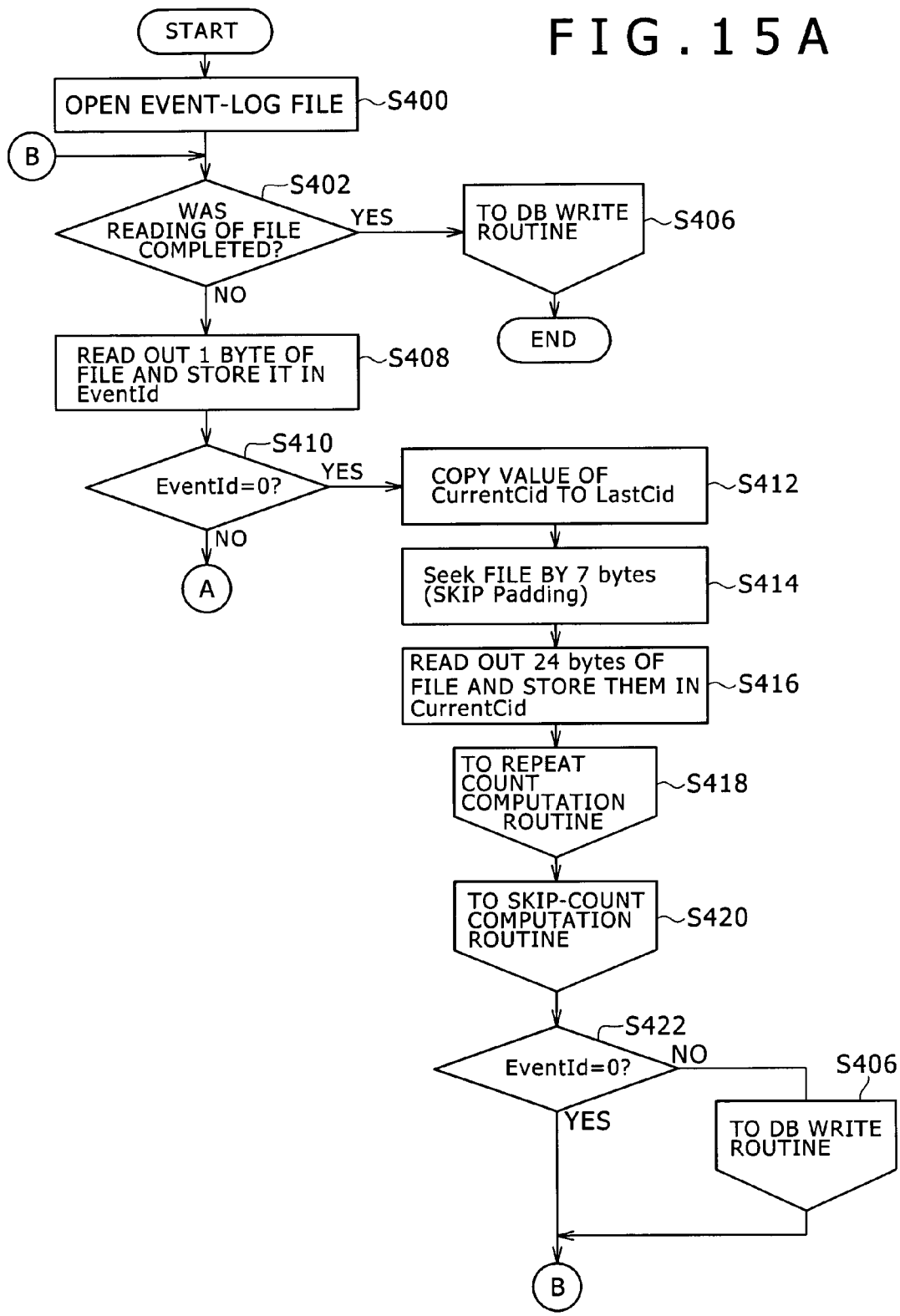
FIG. 15A shows a flowchart representing processing to analyze a log of events in accordance with the embodiment.

The flowchart shown in FIG. 15A begins with a step S400 at which the information-processing apparatus 102 opens an event-log file. Then, at the next step S402, the information-processing apparatus 102 produces a result of determination as to whether or not a process to read out data from the event-log file has been ended. If the result of the determination indicates that the process to read out data from the event-log file has been ended, the flow of the processing goes on to a step S406 at which the information-processing apparatus 102 calls a DB (database) write routine represented by a flowchart shown in FIG. 20. If the determination result produced in the process carried out at the step S402 indicates that the process to read out data from the event-log file has not been ended, on the other hand, the flow of the processing goes on to a step S408 at which the information-processing apparatus 102 reads out a record of one byte from the event-log file and stores the record in variable EventID. It is to be noted that a variable is a name defined in the source code of a program as a name to be given to a memory location. Then, at the next step S410, the information-processing apparatus 102 produces a result of determination as to whether or not a value stored in variable EventID is 0. If the result of the determination indicates that the value stored in variable EventID is 0, the flow of the processing goes on to a step S412. The value stored in variable EventID is an event ID. As shown in FIG. 7, an event ID of 00 indicates the start of the content and is followed by a content ID.

At the step S412, the information-processing apparatus 102 copies the value of variable CurrentCid to variable LastCid. Then, at the next step S414, the information-processing apparatus 102 skips the event-log file by seven bytes. Subsequently, at the next step S416, the information-processing apparatus 102 reads out a record of 24 bytes from the event-log file and stores the record in variable CurrentCid. That is to say, the information-processing apparatus 102 reads out a content ID having a length of 24 bytes from the event-log file and temporarily stores the content ID at a memory location having the name of CurrentCid.

Figure 17:
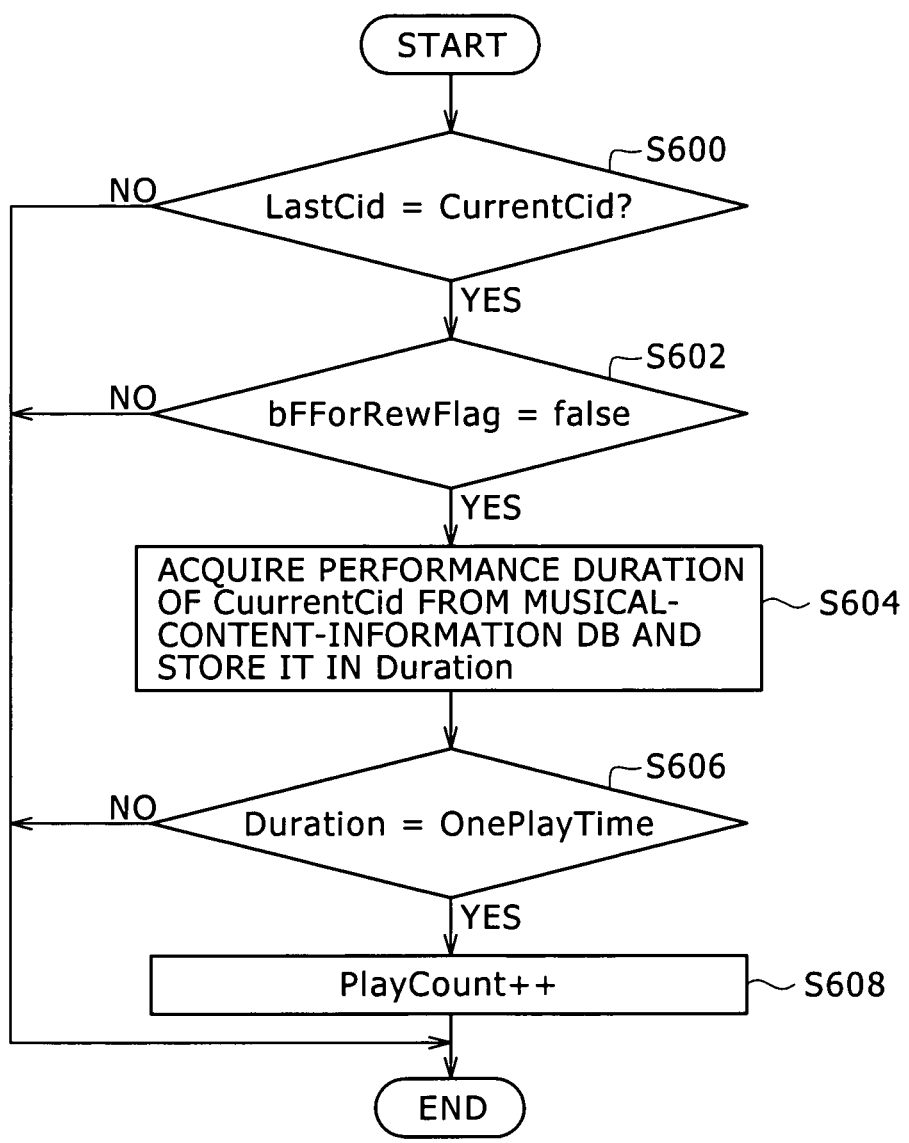
FIG. 17 shows a flowchart representing processing to compute the number of repeats in accordance with the embodiment.

Then, at the next step S418, the information-processing apparatus 102 calls a repeat-count computation routine represented by a flowchart shown in FIG. 17. Subsequently, at the next step S420, the information-processing apparatus 102 calls a skip-count computation routine represented by a flowchart shown in FIG. 19. Then, at the next step S422, the information-processing apparatus 102 produces a result of determination as to whether or not a value stored in variable EventID is 0. If the result of the determination indicates that the value stored in variable EventID is 0, the flow of the processing goes back to the step S402. If the result of the determination indicates that the value stored in variable EventID is not 0, on the other hand, the flow of the processing goes on to the step S406 at which the information-processing apparatus 102 calls the DB write routine. Then, the flow of the processing goes back to the step S402.

Figure 15B:
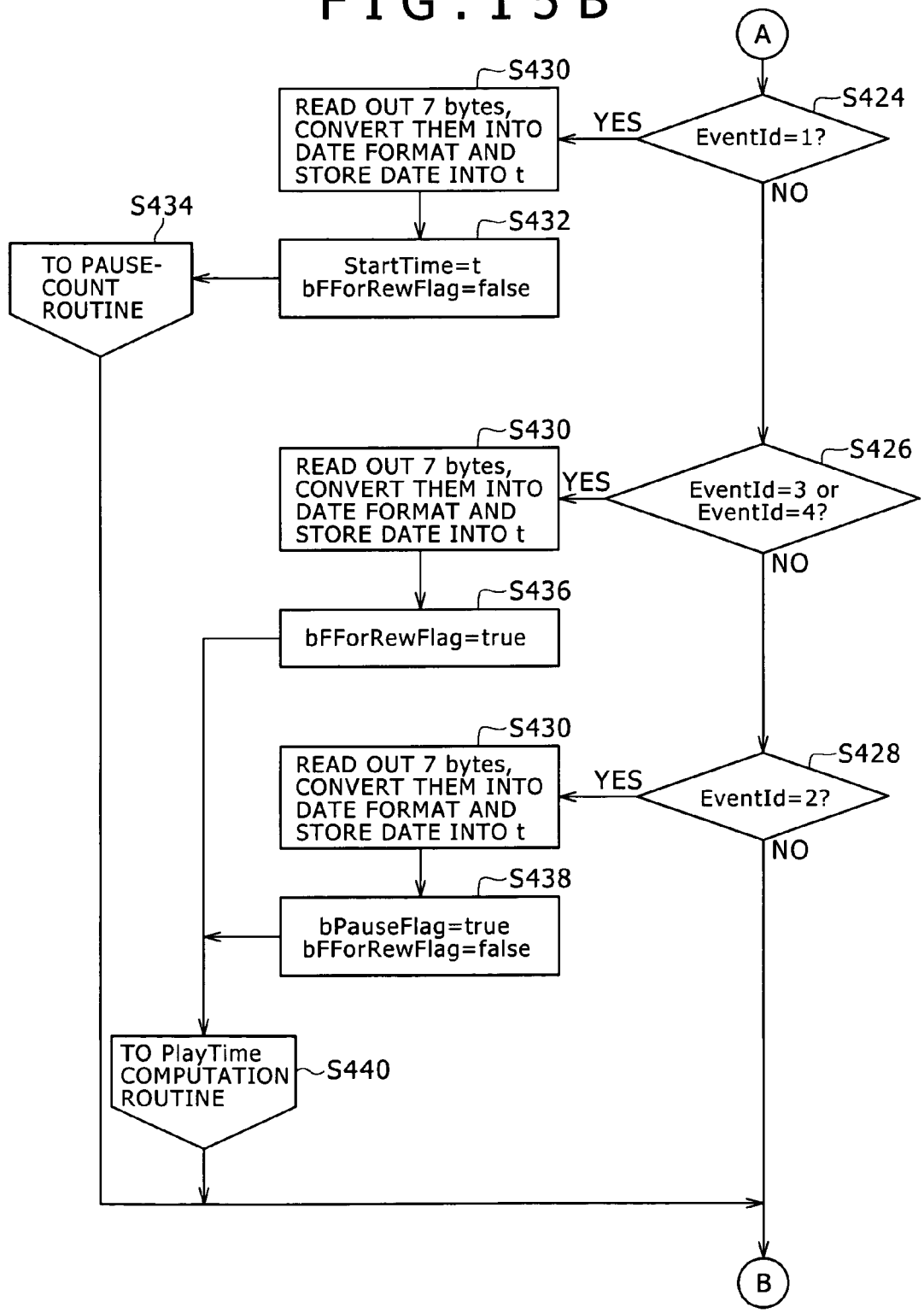
FIG. 15B shows a flowchart representing the continuation of the processing to analyze a log of events in accordance with the embodiment.

If the determination result produced in the process carried out at the step S410 indicates that the value stored in variable EventID is not 0, on the other hand, the flow of the processing goes on to a step S424 of the flowchart shown in FIG. 15B. At the step S424, the information-processing apparatus 102 produces a result of determination as to whether or not a value stored in variable EventID is 1. If the result of the determination indicates that the value stored in variable EventID is 1, the flow of the processing goes on to a step S430. As described earlier, the value stored in variable EventID is an event ID. As shown in FIG. 7, an event ID of 1 indicates the start of reproduction of the content and is followed by a date/time at which the reproduction was started. At the step S430, the information-processing apparatus 102 reads out a record of seven bytes from the event-log file, converts the record into data of the date/time format and stores the date/time in variable t. That is to say, the information-processing apparatus 102 reads out a date/time having a length of seven bytes from the event-log file and temporarily stores the date/time at a memory location having the name of t.

Then, at the next step S432, the information-processing apparatus 102 copies the value stored in variable t to variable StartTime and sets variable bFForRewFlag at a value of false.

Variable StartTime is a variable for storing a date/time at which reproduction of the content was started. Variable bFForRewFlag is a flag indicating whether or not the fast-forward mode or the rewind mode has been established. To be more specific, variable bFForRewFlag set at a value of false indicates that neither the fast-forward mode nor the rewind mode has been established. On the other hand, variable bFForRewFlag set at a value of true indicates that either the fast-forward mode or the rewind mode has been established. The information-processing apparatus 102 carries out the process of the step S432 for an event ID of 1 implying the start of reproduction of a content or indicating that neither the fast-forward mode nor the rewind mode has been established. For this reason, variable bFForRewFlag is set at a value of false. Then, at the next step S434, the information-processing apparatus 102 calls a pause-count computation routine. Subsequently, the flow of the processing goes back to the step S402 of the flowchart shown in FIG. 15A.

If the determination result produced in the process carried out at the step S424 indicates that the value stored in variable EventID is not 1, on the other hand, the flow of the processing goes on to a step S426. At the step S426, the information-processing apparatus 102 produces a result of determination as to whether or not a value stored in variable EventID is 3 or 4. If the result of the determination indicates that the value stored in variable EventID is 3 or 4, the flow of the processing goes on to a step S430. As described earlier, the value stored in variable EventID is an event ID. As shown in FIG. 7, an event ID of 3 or 4 indicates respectively the start of a fast-forward or rewind mode of the content and is followed by a date/time at which the fast-forward or rewind mode was started. At the step S430, the information-processing apparatus 102 reads out a record of seven bytes from the event-log file, converts the record into data of the date/time format and stores the date/time in variable t. That is to say, the information-processing apparatus 102 reads out a date/time having a length of seven bytes from the event-log file and temporarily stores the date/time at a memory location having the name of t.

Then, at the next step S436, the information-processing apparatus 102 sets variable bFForRewFlag at a value of true. The information-processing apparatus 102 carries out the process of the step S436 for an event ID of 3 or 4 indicating that respectively either the fast-forward mode or the rewind mode has been established. For this reason, variable bFForRewFlag is set at a value of true. Then, at the next step S440, the information-processing apparatus 102 calls a PlayTime computation routine represented by a flowchart shown in FIG. 16. Subsequently, the flow of the processing goes back to the step S402 of the flowchart shown in FIG. 15A.

If the determination result produced in the process carried out at the step S426 indicates that the value stored in variable EventID is neither 3 nor 4, on the other hand, the flow of the processing goes on to a step S428. At the step S428, the information-processing apparatus 102 produces a result of determination as to whether or not a value stored in variable EventID is 2. If the result of the determination indicates that the value stored in variable EventID is 2, the flow of the processing goes on to a step S430. As described earlier, the value stored in variable EventID is an event ID. As shown in FIG. 7, an event ID of 2 indicates the end of the reproduction of the content and is followed by a date/time at which the reproduction of the content was ended. At the step S430, the information-processing apparatus 102 reads out a record of seven bytes from the event-log file, converts the record into data of the date/time format and stores the date/time in variable t. That is to say, the information-processing apparatus 102 reads out a date/time having a length of seven bytes from the event-log file and temporarily stores the date/time at a memory location having the name of t.

Then, at the next step S438, the information-processing apparatus 102 sets variable bPauseFlag at a value of true and variable bFForRewFlag at a value of false. Variable bPauseFlag is a flag indicating whether or not the reproduction of the content has been stopped. To be more specific, variable bPauseFlag set at a value of false indicates that the reproduction of the content has not been stopped. On the other hand, variable bPauseFlag set at a value of true indicates that the reproduction of the content has been stopped. The information-processing apparatus 102 carries out the process of the step S438 for an event ID of 2 indicating that the reproduction of the content has been stopped. For this reason, variable bFForRewFlag is set at a value of true while variable bFForRewFlag at a value of false. Then, at the next step S440, the information-processing apparatus 102 calls the PlayTime computation routine represented by the flowchart shown in FIG. 16. Subsequently, the flow of the processing goes back to the step S402 of the flowchart shown in FIG. 15A.

Figure 16:
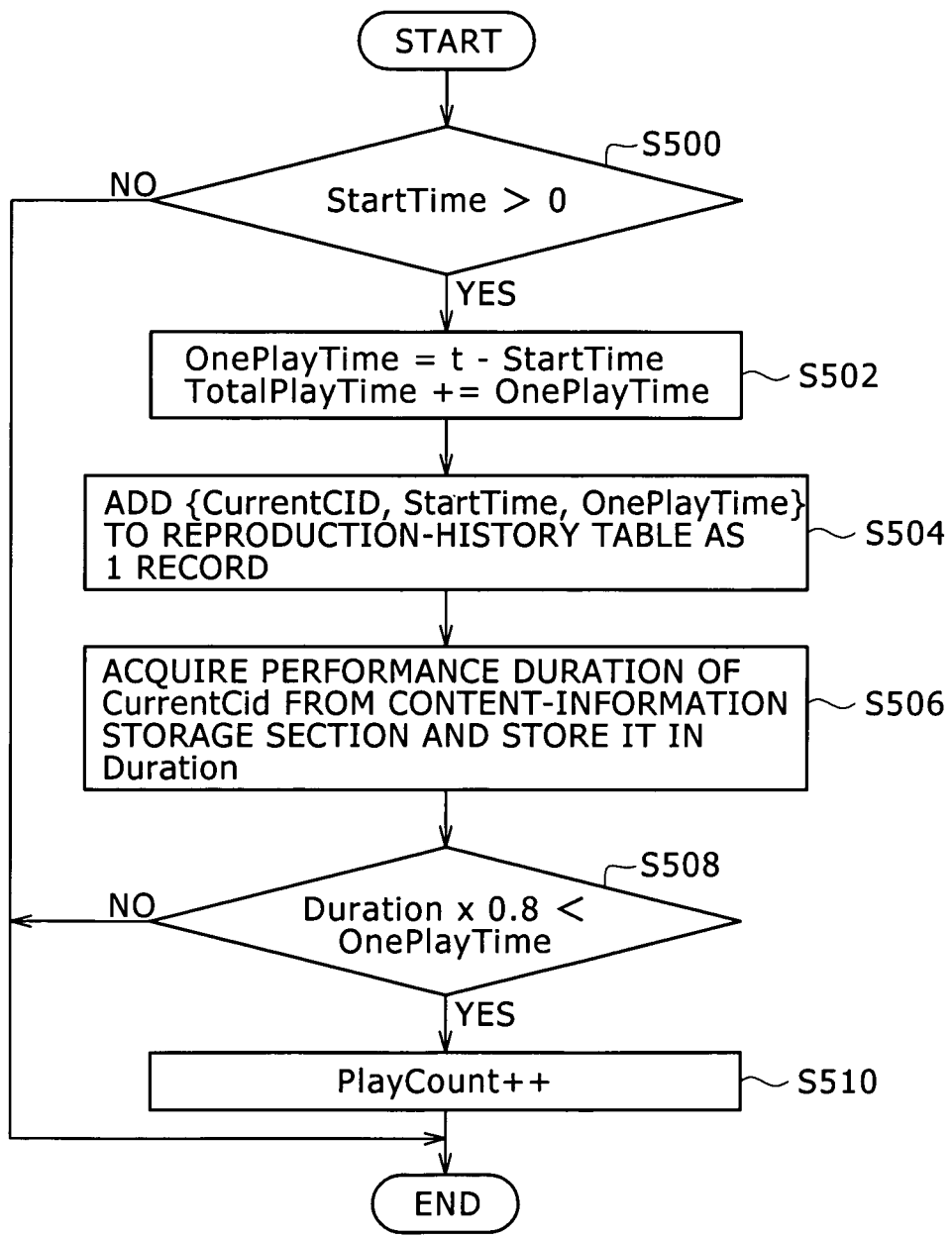
FIG. 16 shows a flowchart representing processing to compute a total reproduction duration in accordance with the embodiment.

FIG. 16 shows a flowchart representing the processing of the PlayTime computation routine cited above. The PlayTime computation routine is executed to find a reproduction duration in a reproduction history, a total reproduction duration of a content and the number of reproductions for the content. The flowchart begins with a step S500 at which the information-processing apparatus 102 produces a result of determination as to whether or not a value stored in variable StartTime is greater than 0. If the result of the determination indicates that the value stored in variable StartTime is not greater than 0, the flow of the processing carried out by the information-processing apparatus 102 exits from the PlayTime computation routine and goes back to the calling program. If the result of the determination indicates that the value stored in variable StartTime is greater than 0, on the other hand, the flow of the processing goes on to a step S502 at which the information-processing apparatus 102 subtracts the value stored in variable StartTime from a value stored in variable t to give a difference, and stores the difference in variable OnePlayTime. Then, the information-processing apparatus 102 adds the value stored in variable OnePlayTime to a current value stored in variable TotalPlayTime to give a sum, and stores the sum back in variable TotalPlayTime. Variable OnePlayTime is a variable used for storing the aforementioned reproduction duration in a reproduction history. On the other hand, variable TotalPlayTime is a variable used for storing the aforementioned total reproduction duration of a content.

Then, at the next step S504, the information-processing apparatus 102 adds values stored in variables CurrentCID, StartTime and OnePlayTime to a reproduction-history table of the analysis-result storage section 314 as one record. Subsequently, at the next step S506, the information-processing apparatus 102 acquires the performance duration of a content identified by a content ID stored in variable CurrentCID from the content-information storage section 312 and stores the performance duration in variable Duration. Then, at the next step S508, the information-processing apparatus 102 produces a result of determination as to whether or not a value stored in variable OnePlayTime is greater than a product obtained as a result of multiplying the value stored in variable Duration by 0.8. If the result of the determination indicates that the value stored in variable OnePlayTime is greater than the product of the value stored in variable Duration and 0.8, the flow of the processing goes on to a step S510 at which the information-processing apparatus 102 increments the current value stored in variable PlayCount by one and stores the incremented value back in variable PlayCount. Variable PlayCount is a variable used for storing the aforementioned number of reproductions for the content. As described above, the information-processing apparatus 102 counts only OnePlayTime longer than 80% of Duration as a reproduction and increments the number of reproductions accordingly.

In the past, the reproduction count representing the number of reproductions for a content is incremented by one if the content is reproduced to the end. Then, reproduction counts incremented in this way are taken into consideration in a process to create a playlist serving as a collection of attributes each used for identifying a content having such a reproduction count exceeding a predetermined number. In accordance with the reproduction-count incrementing method provided by the embodiment of the present invention, however, the reproduction count is incremented by one even if the content is reproduced only for a continuous period at least equal to 80% of the performance duration of the content, that is, even if the content is reproduced not to the end of the content. Thus, in the case of a piece of music having typically a long performance duration, for example, a reproduction of the piece of music may be regarded as one reproduction even if the user stops the reproduction while the piece of music is being reproduced.

FIG. 17 shows a flowchart representing the processing of the repeat-count computation routine cited above. The repeat-count computation routine is executed to find the number of repeats. The flowchart begins with a step S600 at which the information-processing apparatus 102 produces a result of determination as to whether or not a value stored in variable LastCid is equal to a value stored in variable CurrentCid. That is to say, the information-processing apparatus 102 produces a result of determination as to whether or not the content reproduced previously is the same as the content reproduced at the present time. If the determination result produced in the process carried out at the step S600 indicates that the value stored in variable LastCid is not equal to the value stored in variable CurrentCid, the flow of the processing exits from the repeat-count computation routine and goes back to the calling program. If the determination result produced in the process carried out at the step S600 indicates that the value stored in variable LastCid is equal to the value stored in variable CurrentCid, on the other hand, the flow of the processing goes on to a step S602 at which the information-processing apparatus 102 produces a result of determination as to whether or not the value of variable bFForRewFlag is the value of false. That is to say, the information-processing apparatus 102 produces a result of determination as to whether or not neither the fast-forward nor rewind mode has been established.

If the determination result produced in the process carried out at the step S602 indicates that the value of variable bFForRewFlag is the value of true, the flow of the processing exits from the repeat-count computation routine and goes back to the calling program. If the determination result produced in the process carried out at the step S602 indicates that the value of variable bFForRewFlag is the value of false, on the other hand, the flow of the processing goes on to a step S604 at which the information-processing apparatus 102 acquires the performance duration of a content identified by a content ID stored in variable CurrentCID from the content-information storage section 312 and stores the performance duration in variable Duration. Then, at the next step S606, the information-processing apparatus 102 produces a result of determination as to whether or not a value stored in variable OnePlayTime is equal to the value stored in variable Duration. If the result of the determination indicates that the value stored in variable OnePlayTime is equal to the value stored in variable Duration, the flow of the processing goes on to a step S608 at which the information-processing apparatus 102 increments the current value stored in variable RepeatCount by one and stores the incremented value back in variable RepeatCount. Variable RepeatCount is a variable used for storing the aforementioned number of repeats for the content.

Figure 18:
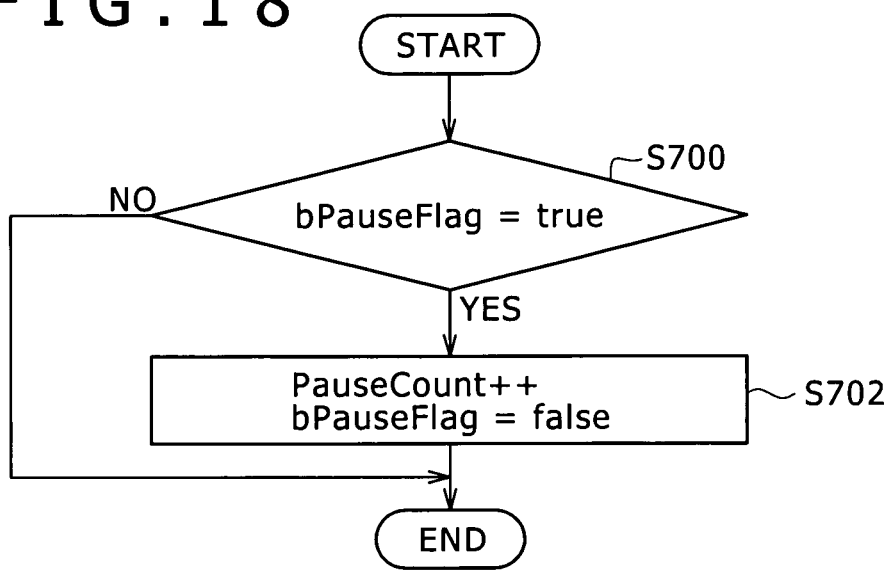
FIG. 18 shows a flowchart representing processing to compute the number of pauses in accordance with the embodiment.

FIG. 18 shows a flowchart representing the processing of the pause-count computation routine cited above. The pause-count computation routine is executed to find the number of pauses. The flowchart begins with a step S700 at which the information-processing apparatus 102 produces a result of determination as to whether or not a value stored in variable bPauseFlag is the value of true. If the determination result produced in the process carried out at the step S600 indicates that the value stored in variable bPauseFlag is the value of false, the flow of the processing exits from the pause-count computation routine and goes back to the calling program. If the determination result produced in the process carried out at the step S700 indicates that the value stored in variable bPauseFlag is the value of true, on the other hand, the flow of the processing goes on to a step S702 at which the information-processing apparatus 102 increments the current value stored in variable PauseCount by one and stores the incremented value back in variable PauseCount. Then, the information-processing apparatus 102 sets variable bPauseFlag at the value of false. Variable PauseCount is a variable used for storing the aforementioned number of pauses for the content.

Figure 19:
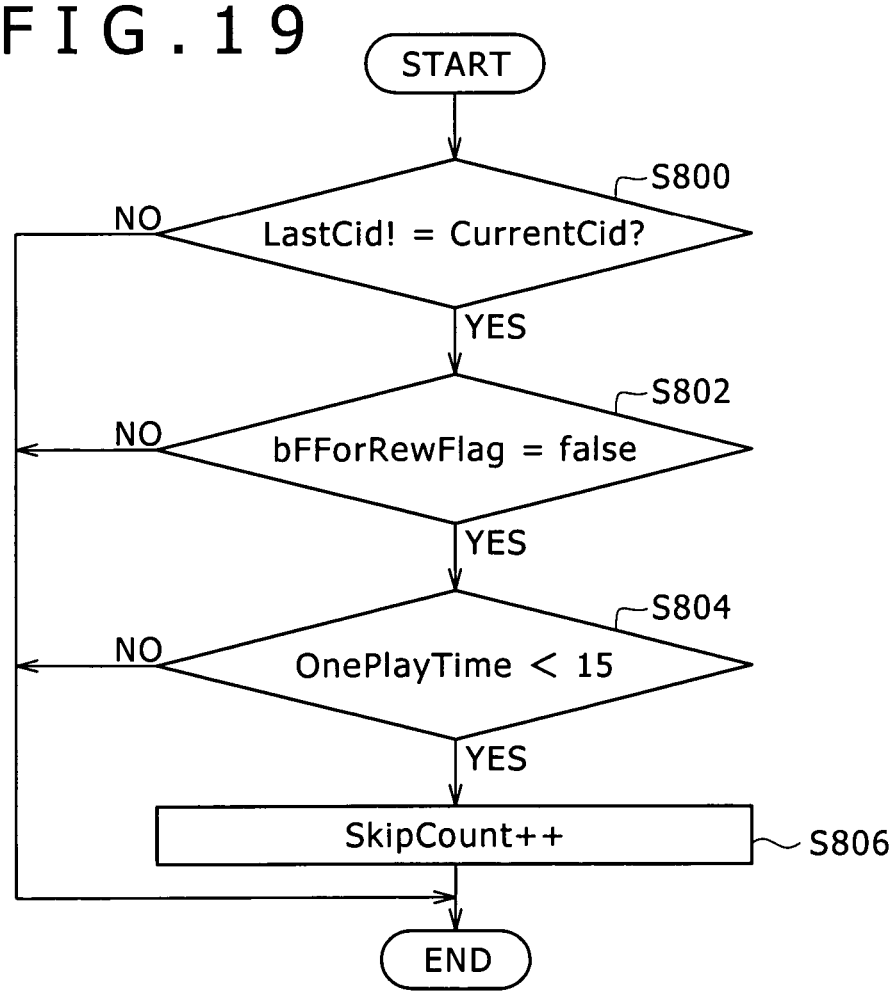
FIG. 19 shows a flowchart representing processing to compute the number of skips in accordance with the embodiment.

FIG. 19 shows a flowchart representing the processing of the skip-count computation routine cited above. The skip-count computation routine is executed to find the number of skips. The flowchart begins with a step S800 at which the information-processing apparatus 102 produces a result of determination as to whether or not a value stored in variable LastCid is equal to a value stored in variable CurrentCid. That is to say, the information-processing apparatus 102 produces a result of determination as to whether or not the content reproduced previously is the same as the content reproduced at the present time. If the determination result produced in the process carried out at the step S800 indicates that the value stored in variable LastCid is equal to the value stored in variable CurrentCid, the flow of the processing exits from the skip-count computation routine and goes back to the calling program.

If the determination result produced in the process carried out at the step S800 indicates that the value stored in variable LastCid is not equal to the value stored in variable CurrentCid, on the other hand, the flow of the processing goes on to a step S802 at which the information-processing apparatus 102 produces a result of determination as to whether or not the value of variable bFForRewFlag is the value of false. That is to say, the information-processing apparatus 102 produces a result of determination as to whether or not neither the fast-forward nor rewind mode has been established. If the determination result produced in the process carried out at the step S802 indicates that the value of variable bFForRewFlag is the value of true, the flow of the processing exits from the skip-count computation routine and goes back to the calling program. If the determination result produced in the process carried out at the step S802 indicates that the of variable bFForRewFlag is the value of false, on the other hand, the flow of the processing goes on to a step S804 at which the information-processing apparatus 102 produces a result of determination as to whether or not the value of variable OnePlayTime is smaller than 15. If the determination result produced in the process carried out at the step S804 indicates that the value of variable OnePlayTime is smaller than 15, on the other hand, the flow of the processing goes on to a step S806 at which the information-processing apparatus 102 increments the current value stored in variable SkipCount by 1 and stores the incremented value back in variable SkipCount. Variable SkipCount is a variable used for storing the aforementioned number of skips for the content. Thus, if the reproduction duration is shorter than 15 seconds, the information-processing apparatus 102 determines that the content has been skipped in the course of its reproduction and increments the number of skips by one.

Figure 20:
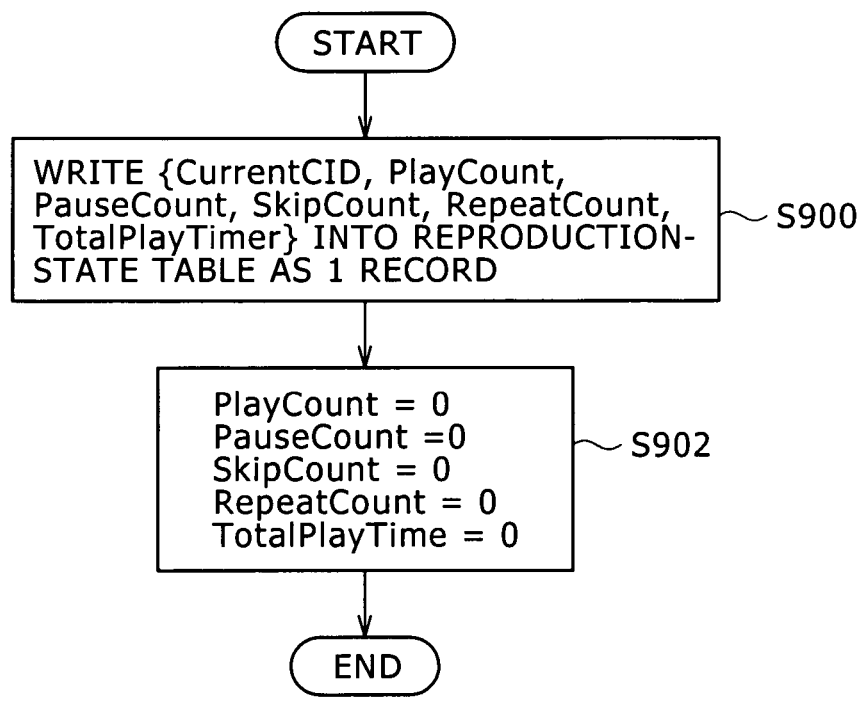
FIG. 20 shows a flowchart representing processing to write data into a database in accordance with the embodiment.

FIG. 20 shows a flowchart representing the processing of the DB write routine cited above. The DB write routine is executed to record results of analyzing a log of events in a reproduction state table stored in the analysis-result storage section 314. The flowchart begins with a step S900 at which the information-processing apparatus 102 writes the values of variables CurrentCID, PlayCount, PauseCount, SkipCount, RepeatCount and TotalPlayTime into the reproduction-state table of the analysis-result storage section 314 as one record. Then, at the next step S902, the information-processing apparatus 102 initializes the variables by setting each of them at zero.

The flows of information processing carried out in the information-processing apparatus 102 and the content reproduction apparatus 104 have been described above.

<Typical Displayed Screens>

By referring to FIGS. 21 to 24, the following description explains typical screens displayed on the display unit employed in the information-processing apparatus 102 or the content reproduction apparatus 104.

Figure 21:
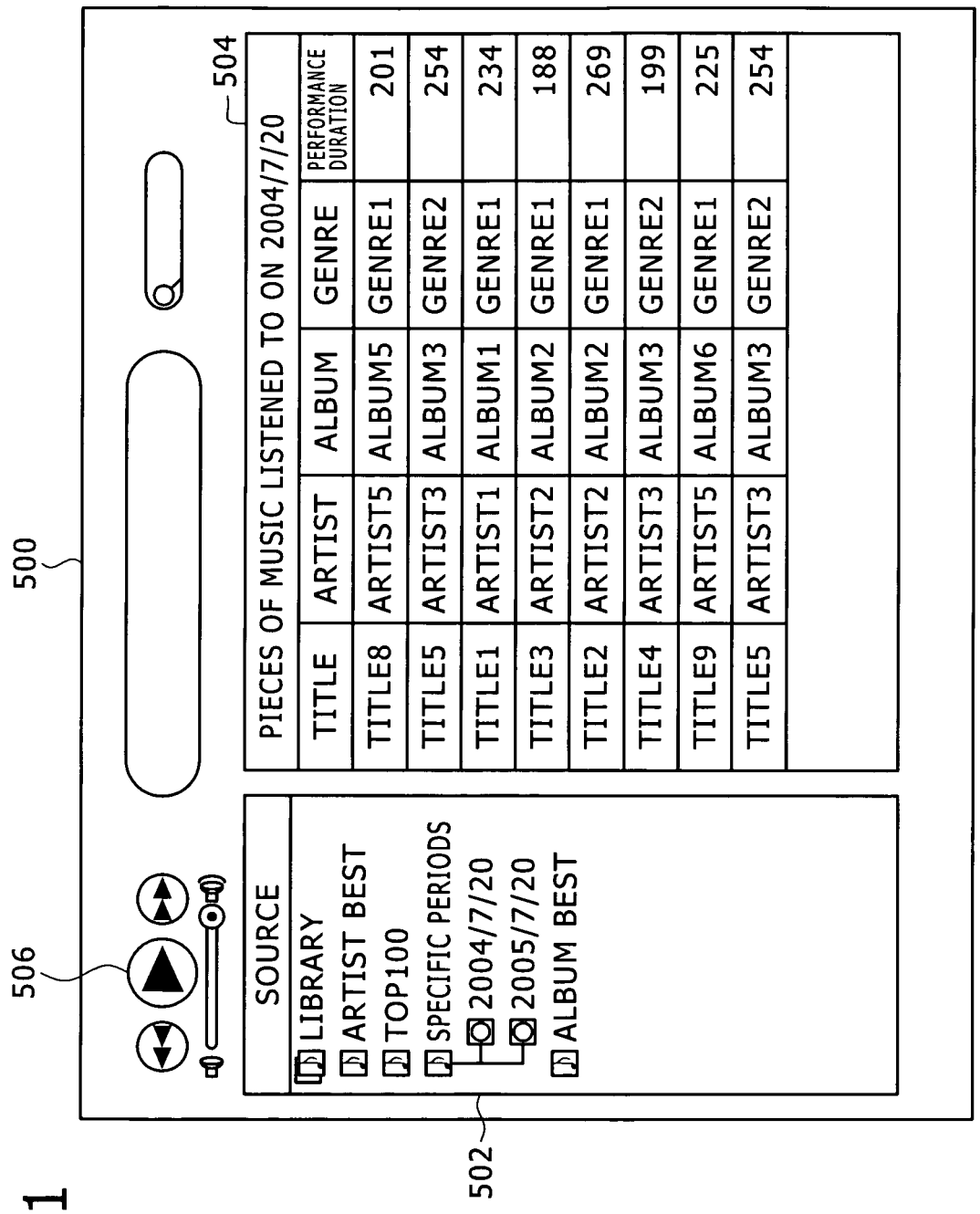
FIG. 21 is an explanatory diagram showing a typical screen appearing on a display unit employed in the information-processing apparatus according to the embodiment.

FIG. 21 is a diagram showing a typical screen displayed by the display control section 332 of the information-processing apparatus 102 on the display unit employed in the information-processing apparatus 102. The information-processing apparatus 102 is capable of displaying a display screen 500 on the display unit as a screen including a selection area 502 used for selecting a playlist to be displayed on the display unit. In the case of the typical display screen shown in FIG. 21, a playlist displayed in the selection area 502 as a playlist of contents reproduced during a specific period of Jul. 20, 2004 is selected, and the selected playlist is displayed in a playlist display area 504. That is to say, when the user selects a desired playlist from those shown in the selection area 502, the selected playlist is displayed in the playlist display area 504. Then, when the user presses a reproduction button 506, the user can listen to contents, which are sequentially reproduced in accordance with the playlist shown in the playlist display area 504.

Figure 22:
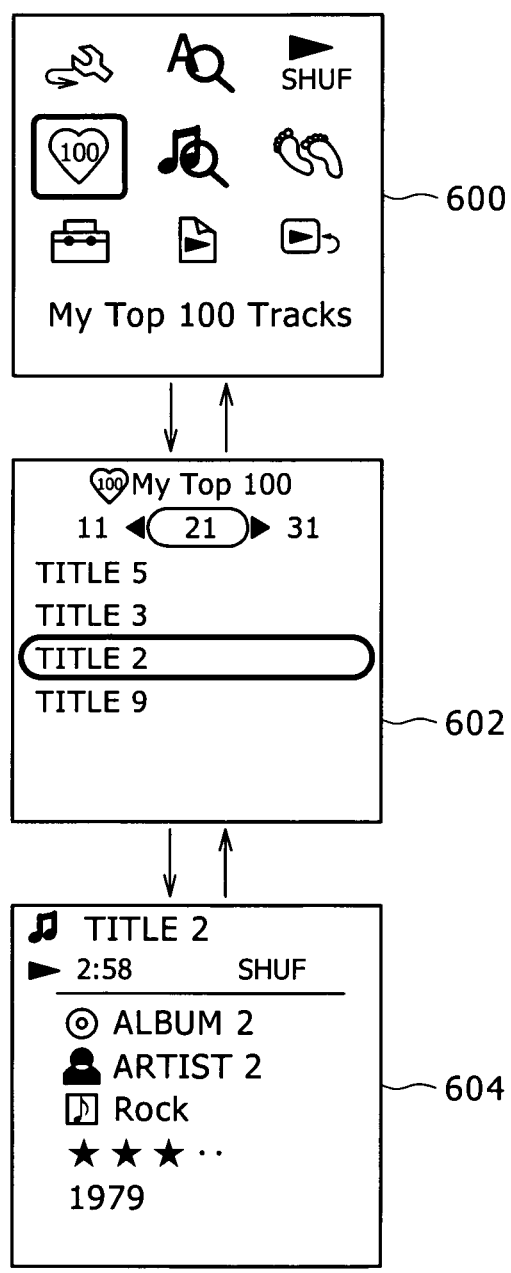
FIG. 22 is an explanatory diagram showing screen transitions occurring on a display unit employed in the content reproduction apparatus according to the embodiment as typical transitions of the display screen appearing on the display unit.
Figure 23:
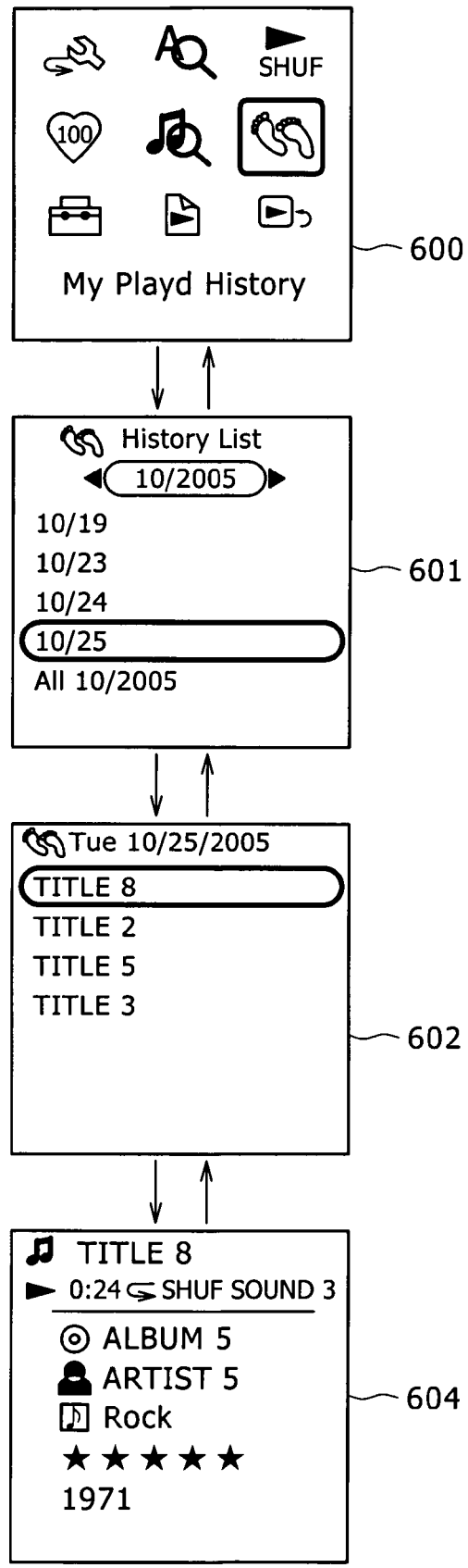
FIG. 23 is an explanatory diagram showing other screen transitions occurring on the display unit employed in the content reproduction apparatus according to the embodiment as typical transitions of the display screen appearing on the display unit.
Figure 24:
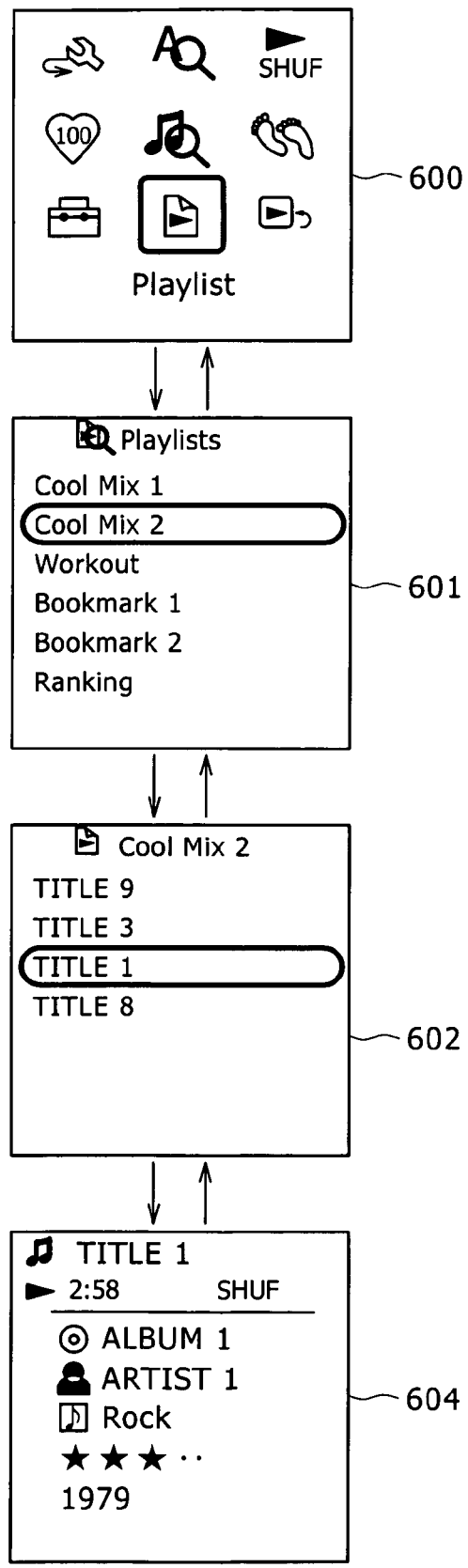
FIG. 24 is an explanatory diagram showing further screen transitions occurring on the display unit employed in the content reproduction apparatus according to the embodiment as typical transitions of the display screen appearing on the display unit.

FIGS. 22 to 24 are each a diagram showing a typical screen displayed by the display control section 220 of the content reproduction apparatus 104 on a display unit employed in the content reproduction apparatus 104. To be more specific, each of FIGS. 22 to 24 shows screen transitions occurring in operations carried out by the user in an attempt to display a playlist on the display unit and reproduce a content included on the playlist.

In particular, FIG. 22 is a diagram showing typical screen transitions occurring in operations carried out by the user to display a playlist on the display unit as a playlist of 100 contents each inferred to be a content serving as a favorite with the user and sorted in an order of decreasing levels of user favoritism and reproduce a desired content included on the playlist. To put it in detail, when the user selects an icon suggesting the display of the playlist for 100 contents from icons appearing on an operation selection screen 600, a playlist display screen 602 is displayed to show attributes put on the desired playlist as the attributes of a plurality of aforementioned contents. As shown in the figure, the playlist display screen 602 typically shows the titles of pieces of music to be performed by reproduction of the contents. Then, when the user further selects the title of a desired content from those shown on the playlist display screen 602, a content-information display screen 604 is displayed to show detailed information on the desired content identified by the selected title. As shown in the figure, the detailed information shown on the content-information display screen 604 as the information on the desired content typically includes the title of the content, the name of an album serving as a collection including the content, the name of an artist associated with the content, the genre of the content and the performance duration of the content. With the detailed information shown on the content-information display screen 604 as the information on the desired content, the user can listen to the content, which is reproduced when the user further carries out an operation to reproduce the content.

FIG. 23 is a diagram showing typical screen transitions occurring in operations carried out by the user to display playlists on the display unit each as a playlist of contents each reproduced during a specific period of time, select a desired one from the displayed playlists and reproduce a desired content included on the desired playlist. To put it in detail, when the user selects an icon suggesting the display of playlists on the display unit each as a playlist of contents each reproduced during a specific period of time from icons appearing on the operation selection screen 600, a playlist selection screen 601 is displayed to show a plurality of playlists classified by reproduction period in a chronological order. Then, when the user further selects a desired playlist from those shown on the playlist selection screen 601, a playlist display screen 602 is displayed to show attributes put on the desired playlist as the attributes of a plurality of contents. Then, when the user further selects the attribute of a desired content from those shown on the playlist display screen 602, a content-information display screen 604 is displayed to show detailed information on the desired content identified by the selected title.

FIG. 24 is a diagram showing typical screen transitions occurring in operations carried out by the user to display playlists each created by the user on the display unit, select a desired one among the displayed playlists and reproduce a desired content included on the desired playlist. To put it in detail, when the user selects an icon suggesting the display of playlists each created by the user on the display unit from icons appearing on the operation selection screen 600, a playlist selection screen 601 is displayed to show a plurality of aforementioned playlists each created by the user. Then, when the user further selects a desired playlist from those shown on the playlist selection screen 601, a playlist display screen 602 is displayed to show attributes put on the desired playlist as the attributes of a plurality of contents. Then, when the user further selects the attribute of a desired content from those shown on the playlist display screen 602, a content-information display screen 604 is displayed to show detailed information on the desired content identified by the selected title. Typical screens displayed on the display unit employed in the information-processing apparatus 102 or the content reproduction apparatus 104 have been described above.

The playlist providing system 100 including information-processing apparatus 102 and content reproduction apparatus 104 in accordance with the embodiment of the present invention has been explained so far. In accordance with the playlist providing system 100 according to the embodiment, the information-processing apparatus 102 and the content reproduction apparatus 104 each store a log of events reflecting states of reproduction operations carried out by the user to manipulate contents. Since the information-processing apparatus 102 creates a playlist serving as a collection of contents on the basis of event logs, the information-processing apparatus 102 is capable of creating a playlist reflecting reproduction operations carried out by the user to manipulate the contents.

It is to be noted that, in the embodiment, the information-processing apparatus 102 and the content reproduction apparatus 104 may create two files of event logs having types different from each other. To put it in detail, for example, the portable reproduction apparatus 104 and the information-processing apparatus 102 create a file used for storing only an event log for subscription contents and a file used for storing an event log for all contents including subscription contents. On top of that, the portable reproduction apparatus 104 and the information-processing apparatus 102 may encrypt the created file used for storing only an event log for subscription contents so that the user is not capable of manipulating the file. In addition, the information-processing apparatus 102 may acquire an encrypted event-log file from the portable reproduction apparatus 104 and transmit the encrypted event-log file received from the portable reproduction apparatus 104 to a copyright management server along with an encrypted event-log file held by the information-processing apparatus 102 itself.

In the configuration described above, the copyright management server is capable of utilizing a file used for storing only an event log for subscription contents in distribution of resources to copyright holders.

The preferred embodiment of the present invention has been explained by referring to diagrams so far. Let us keep in mind, however, that it is needless to say that the scope of the present invention is by no means limited to the preferred embodiment. It is obvious that a person skilled in the art is capable of coming up with a variety of modifications and corrections falling in domains described in claims attached to this specification as modifications and corrections that can be made to the preferred embodiment. Such modifications and corrections should be naturally interpreted as modifications and corrections in the technological range of the present invention.

What is claimed is:

1. An information-processing apparatus comprising:
    an event-log acquisition section acquiring an event log, provided by a content reproduction apparatus reproducing contents, said event log including information identifying said contents and information indicating a reproduction start date/time and reproduction end date/time for each of said contents;
    an event-log analysis section deriving, from said event log, said reproduction start date/time and reproduction end date/time of each of said contents reproduced by said content reproduction apparatus;
    a playlist generation section generating a playlist, said playlist including pieces of information, each piece identifying a content of said contents reproduced by said content reproduction apparatus during a specific period, and said playlist generated on the basis of said reproduction start date/time and reproduction end date/time of said contents, as determined from said event log by said event-log analysis section;
    a playlist transfer section transmitting said playlist to said content reproduction apparatus; and
    a condition inputting section inputting said specific period, said specific period defining a particular date or a particular date range, wherein
    said reproduction start date/time and reproduction end date/time of said contents define reproduction date/time periods of said contents, and
    said playlist generation section generates said playlist on the basis of said reproduction start date/time and reproduction end date/time of said contents, as determined from said event log by said event-log analysis section, such that said playlist identifies contents having reproduction date/time periods that are within said specific period.

2. The information-processing apparatus according to claim 1, wherein:
    said event-log analysis section finds a total reproduction duration of each content reproduced by said content reproduction apparatus from said event log; and
    said playlist generation section generates said playlist on the basis a content identified in said playlist has been reproduced for at least a predetermined period of time, on the basis of said total reproduction duration of said contents from said event log.

3. The information-processing apparatus according to claim 1, wherein:
    said event-log analysis section finds a number of reproductions for each content reproduced by said content reproduction apparatus from said event log; and
    said playlist generation section generates said playlist on the basis a content identified in said playlist has been reproduced at least a predetermined number of times, on the basis of said number of reproductions for said content from said event log.

4. The information-processing apparatus according to claim 1, wherein:
    said event log includes information indicating a transition from a current content being reproduced to a next content reproduced next;
    said event-log analysis section finds a skip count, which represents a number of skips requesting a transition from said current content being reproduced to said next content reproduced next, from said event log for each of said contents; and
    said playlist generation section generates said playlist on the basis a content identified in said playlist has been reproduced to result in a skip count not greater than a predetermined value, on the basis of said skip count from said event log.

5. The information-processing apparatus according to claim 1, wherein:
    said event log includes information indicating stopping of reproduction of a current content in the course of said reproduction of said current content;
    said event-log analysis section finds a pause count, which represents a number of pauses started by stopping of reproduction of said current content in the course of said reproduction of said current content, from said event log for each of said contents; and
    said playlist generation section generates said playlist on the basis a content identified in said playlist has been reproduced to result in a pause count not greater than a predetermined value, on the basis of said pause count from said event log.

6. The information-processing apparatus according to claim 1, wherein:
    said event log includes information indicating a plurality of repeated continuous reproductions of a content;
    said event-log analysis section finds a repeat count, which represents a number of requested repeats of reproduction of said content, from information included in said event log as said information indicating a plurality of repeated continuous reproductions of said content for each of said contents; and said playlist generation section generates said playlist on the basis a content identified in said playlist has been reproduced to result in a repeat count at least equal to a predetermined value, on the basis of said repeat count from said event log.

7. The information-processing apparatus according to claim 1, said information-processing apparatus further comprising:
a content reproduction section configured to reproduce a content;
an event-log storage section storing an event log including information identifying contents reproduced by said content reproduction section and information indicating a reproduction start date/time and reproduction end date/time for said content; and
an event-log updating section updating said event log stored in said event-log storage section;
wherein:
said event-log analysis section derives a reproduction start date/time and reproduction end date/time of said content reproduced by said content reproduction section from information included in said event log stored in said event-log storage section; and
said playlist generation section generates said playlist, said playlist including pieces of information, each piece identifying:
a content of said contents reproduced by said content reproduction apparatus during a specific period of time, said playlist generated on the basis of said reproduction start date/time and reproduction end date/time included in said event log received from said content reproduction apparatus; and
a content reproduced by said content reproduction section during said specific period of time, said playlist generated on the basis of said reproduction start date/time and reproduction end date/time included in said event log stored in said event-log storage section.

8. The information-processing apparatus according to claim 1, said information-processing apparatus further comprising:
a connection detection section detecting a state in which said content reproduction apparatus is connected to said information-processing apparatus, wherein said event-log acquisition section acquires said event log provided from said content reproduction apparatus, which is connected to said information-processing apparatus as indicated by a result of detection carried out by said connection detection section.

9. The information-processing apparatus according to claim 1, said information-processing apparatus further comprising:
a playlist storage section storing a playlist generated by said playlist generation section; and
a playlist uploading section uploading a playlist stored in said playlist storage section to an external server.

10. The information-processing apparatus according to claim 1, wherein said playlist is a list consisting of information identifying content of said contents which have been reproduced by said content reproduction apparatus.

11. The information-processing apparatus according to claim 1, wherein said contents are audio musical contents.

12. The information-processing apparatus according to claim 1, wherein said playlist transfer section transmits said playlist to said content reproduction apparatus together with information identifying said specific period such that said playlist is displayable on said content reproduction apparatus together with said information identifying said specific period.

13. A non-transitory computer readable medium having recorded thereon a computer executable computer program which causes the computer to carry out:
an event-log acquisition process of acquiring an event log, provided by a content reproduction apparatus reproducing contents, said event log including information identifying said contents and information indicating a reproduction start date/time and reproduction end date/time for each of said contents;
an event-log analysis process of deriving, from said event log, said reproduction start date/time and reproduction end date/time of each of said contents reproduced by said content reproduction apparatus;
a playlist generation process of generating a playlist, said playlist including pieces of information, each piece identifying a content of said contents reproduced by said content reproduction apparatus during a specific period, and said playlist generated on the basis of said reproduction start date/time and reproduction end date/time of said contents, as determined from said event log by said event-log analysis process;
a playlist transfer process of transmitting said playlist to said content reproduction apparatus; and
a condition inputting process of inputting said specific period, said specific period defining a particular date or a particular date range, wherein
said reproduction start date/time and reproduction end date/time of said contents define reproduction date/time periods of said contents, and
said playlist generation process generates said playlist on the basis of said reproduction start date/time and reproduction end date/time of said contents, as determined from said event log by said event-log analysis process, such that said playlist identifies contents having reproduction date/time periods that are within said specific period.

14. An information processing method, comprising:
acquiring an event log, provided by a content reproduction apparatus reproducing contents, said event log including information identifying said contents and information indicating a reproduction start date/time and reproduction end date/time for each of said contents;
deriving, from said event log, said reproduction start date/time and reproduction end date/time of each of said contents reproduced by said content reproduction apparatus;
inputting a specific period, said specific period defining a particular date or a particular date range;
generating a playlist, said playlist including pieces of information, each piece identifying a content of said contents reproduced by said content reproduction apparatus during a specific period of time, and said playlist generated on the basis of said reproduction start date/time and reproduction end date/time of said contents, as determined from said event log by said deriving, wherein
said reproduction start date/time and reproduction end date/time of said contents define reproduction date/time periods of said contents, and said generating said playlist generates said playlist on the basis of said reproduction start date/time and reproduction end date/time of said contents, as determined from said event log, such that said playlist identifies contents having reproduction date/time periods that are within said specific period; and transmitting said playlist to said content reproduction apparatus.

15. The information processing method according to claim 14, whereby:

said event-log analysis step is executed to find a total reproduction duration of each content reproduced by said content reproduction apparatus from said event log; and said playlist generation step is executed to generate said playlist on the basis a content identified in said playlist has been reproduced for at least a predetermined period of time, on the basis of said total reproduction duration of said contents from said event log.

16. The information processing method according to claim 14, whereby:

said event-log analysis step is executed to find a number of reproductions for each content reproduced by said content reproduction apparatus from said event log; and said playlist generation step is executed to generate said playlist on the basis a content identified in said playlist has been reproduced at least a predetermined number of times, on the basis of said number of reproductions for said content from said event log.

17. The information processing method according to claim 14, wherein:

said event log includes information indicating a transition from a current content being reproduced to a next content reproduced next;

said event-log analysis step is executed to find a skip count, which represents a number of skips requesting a transition from said current content being reproduced to said next content reproduced next, from said event log for each of said contents; and said playlist generation step is executed to generate said playlist on the basis a content identified in said playlist has been reproduced to result in a skip count not greater than a predetermined value, on the basis of said skip count from said event log.

18. The information processing method according to claim 14, wherein:

said event log includes information indicating stopping of reproduction of a current content in the course of said reproduction of said current content;

said event-log analysis step is executed to find a pause count, which represents a number of pauses started by stopping of reproduction of said current content in the course of said reproduction of said current content, from said event log for each of said contents; and said playlist generation step is executed to generate said playlist on the basis a content identified in said playlist has been reproduced to result in a pause count not greater than a predetermined value, on the basis of said pause count from said event log.

19. The information processing method according to claim 14, wherein:

said event log includes information indicating a plurality of repeated continuous reproductions of a content;

said event-log analysis step is executed to find a repeat count, which represents a number of requested repeats of reproduction of said content, from information included in said event log as said information indicating a plurality of repeated continuous reproductions of said content for each of said contents; and said playlist generation step is executed to generate said playlist on the basis a content identified in said playlist has been reproduced to result in a repeat count at least equal to a predetermined value, on the basis of said repeat count from said event log.

20. The information processing method according to claim 14, said information processing method further comprising:

a content reproduction step of reproducing a content;

an event-log storage step of storing an event log including information identifying contents reproduced at said content reproduction step and information indicating a reproduction start date/time and reproduction end date/time for said content in a recording medium;

wherein said event-log analysis step is further executed to derive a reproduction start date/time and reproduction end date/time of said content reproduced at said content reproduction step from information included in said event log stored in said recording medium at said event-log storage step; and said playlist generation step is executed to generate said playlist, said playlist including pieces of information, each piece identifying:

a content of said contents reproduced by said content reproduction apparatus during a specific period of time, said playlist generated on the basis of said reproduction start date/time and reproduction end date/time included in said event log received from said content reproduction apparatus; and a content reproduced at said content reproduction step during said specific period of time, said playlist generated on the basis of said reproduction start date/time and reproduction end date/time included in said event log stored in said recording medium at said event-log storage step.

21. The information processing method according to claim 14, said information processing method further comprising:

a connection detection step of detecting a state in which said content reproduction apparatus is connected to said information processing apparatus, whereby said event-log acquisition step is executed to acquire said event log provided from said content reproduction apparatus, which is connected to said information processing apparatus as indicated by a result of detection carried out at said connection detection step.

22. The information processing method according to claim 14, said information processing method further comprising:

a playlist storage step of storing a playlist generated at said playlist generation step in a recording medium; and a playlist uploading step of uploading a playlist stored in said recording medium at said playlist storage step to an external server.

23. A content reproduction apparatus comprising:

a content storage section storing contents;

a reproduction operation section selecting a specific one from said contents stored in said content storage section;

a date/time generation section generating a date/time;

a content reproduction section reproducing a content selected by said reproduction operation section;

an event-log storage section storing an event log including at least information identifying a content reproduced by said content reproduction section and information indicating a reproduction start date/time and reproduction end date/time of said content;

an event-log creating/updating section creating a new event log, storing said new event log into said event-log storage section, and updating an event log already stored in said event-log storage section by creating a record showing a date/time generated by said date/time generation section and adding said created record to said already stored event log;

an event-log transfer section transmitting an event log stored in said event-log storage section to an external apparatus;

a playlist acquisition section acquiring a playlist generated by said external apparatus on the basis of said transmitted event log, said playlist including pieces of information, each piece identifying a content of said contents stored in said content storage section which satisfies a predetermined date/time condition as determined from said transmitted event log;

a condition inputting section inputting said predetermined date/time condition as a specific period, said specific period defining a particular date or a particular date range; and a playlist storage section storing a playlist acquired by said playlist acquisition section, wherein said playlist is generated such that said playlist identifies contents having reproduction start dates/times and reproduction end dates/times that are within said specific period.

24. The content reproduction apparatus according to claim 23, wherein each event record put on an event log stored in said event-log storage section comprises:

mutually relevant pieces of information such as an event ID showing the type of a process carried out by said content reproduction section on a content; and a start date/time of said process and information identifying said content serving as an object of said process.

25. The content reproduction apparatus according to claim 24, wherein processes carried out by said content reproduction section on a content include a process to reproduce said content.

26. The content reproduction apparatus according to claim 25, wherein processes carried out by said content reproduction section on a content comprise at least a process to stop reproduction of said content, a process to put said content being reproduced in a fast-forward mode and a process to put said content being reproduced in a rewind mode.

27. The content reproduction apparatus according to claim 24, wherein:

when a content is reproduced by said content reproduction section from the beginning of data composing said content, said event-log creating/updating section adds said information identifying said content to an event log stored in said event-log storage section.

28. A non-transitory computer readable medium having recorded thereon a computer executable computer program which causes the computer to carry out:

a content selection process of selecting a specific content from contents stored on a recording medium;

a content reproduction process of reproducing a content selected in said content selection process;

a date/time generation process of generating a date/time;

an event-log recording process of generating an event log, which includes at least information identifying a content reproduced in said content reproduction process and information indicating a reproduction start date/time and reproduction end date/time of said content, by using a date/time generated in said date/time generation process and recording said event log onto said recording medium;

an event-log transfer process of transmitting an event log to an external apparatus;

a playlist acquisition process of acquiring a playlist generated by said external apparatus on the basis of said transmitted event log, said playlist including pieces of information, each piece identifying a content of said contents stored on the recording medium which satisfies a predetermined date/time condition as determined from said transmitted event log; and a condition inputting process of inputting said predetermined date/time condition as a specific period, said specific period defining a particular date or a particular date range, wherein said playlist is generated such that said playlist identifies contents having reproduction start dates/times and reproduction end dates/times that are within said specific period.

29. An event-log creation method comprising the steps:

selecting a specific content from contents stored on a recording medium;

reproducing a content selected at said content selection step;

a date/time generation step of generating a date/time;

an event-log recording step of generating an event log, which includes at least information identifying a content reproduced at said content reproduction step and information indicating a reproduction start date/time and reproduction end date/time of said content, by using a date/time generated at said date/time generation step and recording said event log onto said recording medium;

an event-log transfer step of transmitting an event log to an external apparatus;

a playlist acquisition step of acquiring a playlist generated by said external apparatus on the basis of said transmitted event log, said playlist including pieces of information, each piece identifying a content of said contents stored on the recording medium which satisfies a predetermined date/time condition as determined from said transmitted event log; and a condition inputting step of inputting said predetermined date/time condition as a specific period, said specific period defining a particular date or a particular date range, wherein said playlist is generated such that said playlist identifies contents having reproduction start dates/times and reproduction end dates/times that are within said specific period.

30. The event-log creation method according to claim 29, wherein each event record put on an event log comprises:

mutually relevant pieces of information such as an event ID showing the type of a process carried out at said content reproduction step on a content; and a start date/time of said process and information identifying said content serving as an object of said process.

31. The event-log creation method according to claim 30, wherein said process carried out at said content reproduction step on a content is a process to reproduce said content, a process to stop reproduction of said content, a process to put said content being reproduced in a fast-forward mode or a process to put said content being reproduced in a rewind mode.

32. The event-log creation method according to claim 30, whereby:

when a content is reproduced at said content reproduction step from the beginning of data composing said content, said event-log recording step is executed to add said information identifying said content to an event log stored on said recording medium.

* * * * *